(12) United States Patent
Constantino et al.

(10) Patent No.: US 12,204,737 B2
(45) Date of Patent: *Jan. 21, 2025

(54) VIRTUAL BUTTONS, METHODS, AND PROGRAM PRODUCTS FOR DYNAMICALLY DISPLAYING GIVEAWAY INFORMATION

(71) Applicant: Sticker Mule, LLC, Amsterdam, NY (US)

(72) Inventors: Anthony Constantino, Amsterdam, NY (US); David Traver, Amsterdam, NY (US); Mitchell Millsaps, Aurora, CO (US)

(73) Assignee: Sticker Mule, LLC, Amsterdam, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,369

(22) Filed: Jun. 8, 2023

(65) Prior Publication Data

US 2023/0350540 A1     Nov. 2, 2023

Related U.S. Application Data

(63) Continuation of application No. 18/083,013, filed on Dec. 16, 2022, now Pat. No. 11,714,521.

(60) Provisional application No. 63/336,302, filed on Apr. 29, 2022.

(51) Int. Cl.
*G06F 3/04817* (2022.01)
*G06F 3/04815* (2022.01)

(52) U.S. Cl.
CPC ...... *G06F 3/04817* (2013.01); *G06F 3/04815* (2013.01)

(58) Field of Classification Search
CPC ............. G06F 3/04817; G06F 3/04815; G06F 3/04886; G06Q 30/0207; G06Q 50/01; G07F 17/3209; G07F 17/3288
See application file for complete search history.

(56) References Cited

U.S. PATENT DOCUMENTS

| | | | | |
|---|---|---|---|---|
| 6,061,660 | A * | 5/2000 | Eggleston | G06Q 30/0239 705/14.12 |
| 10,282,740 | B1 * | 5/2019 | Bramwell | G06Q 30/0239 |
| 2002/0198054 | A1 * | 12/2002 | Auxier | G07F 17/329 463/42 |
| 2004/0043810 | A1 * | 3/2004 | Perlin | G06Q 30/02 463/16 |
| 2011/0059800 | A1 * | 3/2011 | Anderson | G07F 17/326 463/42 |
| 2013/0024290 | A1 | 1/2013 | Berg | G06Q 30/0201 705/14.66 |

(Continued)

*Primary Examiner* — K C Chen
(74) *Attorney, Agent, or Firm* — Hoffman Warnick LLC

(57) ABSTRACT

Virtual buttons for dynamically displaying giveaway information are disclosed. The virtual buttons may include an interactive body, and dynamic information displayed within the body. The dynamic information may be associated with a giveaway. The dynamic information may include a first set of information relating to the giveaway and displayed prior to a user's interaction with the interactive body, a second set of information relating to the giveaway and displayed after the user's interaction with the interactive body, and a third set of information relating to the giveaway and displayed after the giveaway has ended.

16 Claims, 21 Drawing Sheets

(56) References Cited

U.S. PATENT DOCUMENTS

2014/0235324 A1\* 8/2014 Ryan ................... G07F 17/3213
                                                                    463/21
2017/0329615 A1\* 11/2017 Kahn ...................... H04L 67/01

\* cited by examiner

VIRTUAL BUTTONS, METHODS, AND PROGRAM PRODUCTS FOR DYNAMICALLY DISPLAYING GIVEAWAY INFORMATION

PRIORITY CLAIM

The present application claims priority or the benefit to U.S. patent application Ser. No. 18/083,013 (filed Dec. 16, 2022), which itself claims priority or benefit to U.S. provisional application No. 63/336,302 (filed Apr. 29, 2022), each of which is herein entirely incorporated by reference.

TECHNICAL FIELD

The disclosure relates generally to displaying information, and more particularly, to virtual buttons, methods, and program products for dynamically displaying information relating to a giveaway or other prize.

BACKGROUND

Conventional platforms and web-based applications ("apps") have been utilized for more than two decades to allow users to accomplish everyday tasks easily and conveniently. From filing paperwork or registering for online educational classes, to streaming media and engaging in social interactions, online or computer-based platforms/apps are used to simplify a growing paperless and virtual world. In order to interact or engage conventional platforms or apps as intended, a series of text boxes and distinct buttons are used to advance through steps or processes. For example, in order to submit personal information to sign-up for a mailing list, users are often required to "click through" multiple pages or sections of the platform or app—each page or section including distinct text boxes and/or distinct buttons that must be engaged in order to advance. However, these conventional text boxes and buttons are often static in nature and provide only a limited amount of information and interaction at each step of the process. This in turn requires coders, developers, and/or programmers to create multiple pages, text boxes, and buttons to achieve each step or process to allow the user to complete a task or enjoy a computer-based experience.

BRIEF DESCRIPTION

All examples and features mentioned below can be combined in any technically possible way.

A first aspect of the disclosure provides a dynamic virtual button, including: an interactive body; and dynamic information displayed within the body, the dynamic information associated with a giveaway, wherein the dynamic information includes: a first set of information relating to the giveaway prior to a user's interaction with the interactive body; a second set of information relating to the giveaway after the user's interaction with the interactive body; and a third set of information relating to the giveaway after the giveaway has ended.

A second aspect of the disclosure provides a method for dynamically displaying information relating to a giveaway on a virtual button. The method includes: generating the virtual button in response to obtaining giveaway data; displaying a first set of information of the dynamic information on the generated, virtual button, the first set of information relating to the giveaway prior to a user's interaction with the virtual button; detecting the user's interaction with the virtual button; in response to detecting the user's interaction with the virtual button, adjusting the dynamic information displayed on the generated, virtual button from the first set of information to a second set of information of the dynamic information; determining that the giveaway has ended based on the obtained giveaway data; and in response to determining that the giveaway has ended, adjusting the dynamic information displayed on the generated, virtual button from the second set of information to a third set of information of the dynamic information.

A third aspect of the disclosure provides a computer program product stored on a non-transitory computer-readable storage medium, which when executed by a computing system, displays dynamic information relating to a giveaway on a virtual button. The computer program product including: program code that generates the virtual button in response to obtaining giveaway data; program code that displays a first set of information of the dynamic information on the generated, virtual button, the first set of information relating to the giveaway prior to a user's interaction with the virtual button; program code that detects the user's interaction with the virtual button; program code that adjusts the dynamic information displayed on the generated, virtual button from the first set of information to a second set of information of the dynamic information in response to the program code detecting the user's interaction with the virtual button; program code that determines that the giveaway has ended based on the obtained giveaway data; and program code that adjusts the dynamic information displayed on the generated, virtual button from the second set of information to a third set of information of the dynamic information in response to the program code determining that the giveaway has ended.

Implementations may include one of the following features, or any combination thereof.

In certain aspects, at least a portion of the dynamic information associated with the giveaway is based on giveaway data predetermined prior to displaying the first set of information within the interactive body.

In particular cases, the first set of information relating to the giveaway includes at least one of: a prize value for the giveaway, the prize value defined by the giveaway data, a number of winners for the giveaway, the number of winners defined by the giveaway data, user-action instructions to enter the giveaway, the user-action instructions defined by the giveaway data, or a time counter identifying an end of the giveaway, the end of the giveaway defined by the giveaway data.

In some aspects, the first set of information relating to the giveaway further includes at least one of: a number of users participating in the giveaway, or a milestone number of users required to enter the giveaway to increase the prize value of the giveaway, the milestone number of users is defined by the giveaway data.

In particular implementations, the second set of information relating to the giveaway includes at least one of: an incomplete entry notification indicating the user has not been entered into the giveaway; entrance verification indicating the user has successfully been entered into the giveaway, the prize value for the giveaway, the prize value defined by the giveaway data, the number of winners for the giveaway, the number of winners defined by the giveaway data, or the time counter identifying the end of the giveaway, the end of the giveaway defined by the giveaway data.

In some aspects, the second set of information relating to the giveaway includes visual restrictions indicating the user is excluded from entering the giveaway based on at least one of the giveaway data or a geolocation of the user, wherein the second set of information relating to the giveaway further includes at least one of: a number of users participating in the giveaway, or a milestone number of users required to enter the giveaway to increase the prize value of the giveaway, the milestone number of users is defined by the giveaway data.

In some cases, the third set of information relating to the giveaway includes at least one of: expiration confirmation indicating the giveaway has ended, the prize value for the giveaway, the prize value defined by the giveaway data, or the number of winners for the giveaway, the number of winners defined by the giveaway data, wherein the third set of information relating to the giveaway further includes: a winner notification prompting the user to interact with the interactive body to view user-data for the winning user of the giveaway, wherein the winner notification of the third set of information is displayed on the body in response to the user performing a rollover action on the interactive body; and at least one of: user-data for the winning user of the giveaway, the user-data displayed on the interactive body in response to the user performing a rollover action on the interactive body.

In certain implementations, the third set of information relating to the giveaway further includes: a personal winning notification notifying the user they have won the giveaway.

In some cases, a dynamic virtual button is displayed in a social media feed in a graphical user interface (GUI), and includes: an interactive body including a visible border displayed in the GUI; and dynamic information displayed within the border of the interactive body, the dynamic information associated with a giveaway, wherein the dynamic information includes: a first set of information relating to the giveaway and displayed prior to a user's interaction with the interactive body; a second set of information relating to the giveaway and displayed after the user's interaction with the interactive body; and a third set of information relating to the giveaway and displayed after the giveaway has ended, wherein the dynamic virtual button is displayed as a portion of the social media feed in the GUI, the social media feed including a plurality of posts.

In particular aspects, at least a portion of the dynamic information associated with the giveaway is based on giveaway data predetermined prior to displaying the first set of information within the interactive body, wherein the first set of information relating to the giveaway includes at least one of: a prize value for the giveaway, the prize value defined by the giveaway data, a number of winners for the giveaway, the number of winners defined by the giveaway data, user-action instructions to enter the giveaway, the user-action instructions defined by the giveaway data, or a time counter identifying an end of the giveaway, the end of the giveaway defined by the giveaway data.

In certain cases, the first set of information relating to the giveaway further includes at least one of: a number of users of the social media feed participating in the giveaway, or a milestone number of users of the social media feed required to enter the giveaway to increase the prize value of the giveaway, wherein the milestone number of users of the social media feed is defined by the giveaway data.

In particular aspects, the second set of information relating to the giveaway includes at least one of: the number of winners for the giveaway, the number of winners defined by the giveaway data, or the time counter identifying the end of the giveaway, the end of the giveaway defined by the giveaway data.

In certain cases, the second set of information relating to the giveaway includes visual restrictions indicating the user is excluded from entering the giveaway based on a geolocation of the user indicating a state of residence of the user, wherein the state of residence of the user restricts access to the giveaway, wherein the second set of information relating to the giveaway further includes: a milestone number of users required to enter the giveaway to increase the prize value of the giveaway, the milestone number of users is defined by the giveaway data.

In particular cases, the third set of information relating to the giveaway includes at least one of: the prize value for the giveaway, the prize value defined by the giveaway data, or the number of winners for the giveaway, the number of winners defined by the giveaway data, wherein the third set of information relating to the giveaway further includes: a winner notification prompting the user to interact with the interactive body to view user-data for the winning user of the giveaway, wherein the winner notification of the third set of information is displayed on the body in response to the user performing a rollover action on the interactive body; and user-data for the winning user of the giveaway, the user-data displayed on the interactive body in response to the user performing a rollover action on the interactive body.

In some aspects, the third set of information relating to the giveaway further includes: a personal winning notification notifying the user they have won the giveaway, wherein the personal winning notification is contained within the border of the interactive body in the social media feed.

In particular cases, adjusting the dynamic information displayed on the generated, virtual button from the first set of information to the second set of information of the dynamic information further includes: discontinuing to display the user-action instructions to enter the giveaway; one of: displaying an incomplete entry notification indicating the user has not been entered into the giveaway, displaying entrance verification indicating the user has successfully been entered into the giveaway, or displaying visual restrictions indicating the user is excluded from entering the giveaway based on at least one of the obtained giveaway data or a geolocation of the user; and continuing to display at least one of: the prize value for the giveaway, the prize value defined by the giveaway data, the number of winners for the giveaway, the number of winners defined by the giveaway data, or the time counter identifying the end of the giveaway, the end of the giveaway defined by the giveaway data, wherein adjusting the dynamic information displayed on the generated, virtual button from the first set of information to the second set of information of the dynamic information further includes at least one of: displaying a number of users participating in the giveaway, or displaying a milestone number of users required to enter the giveaway to increase the prize value of the giveaway, the milestone number of users is defined by the giveaway data, wherein adjusting the dynamic information displayed on the generated, virtual button from the second set of information to the third set of information of the dynamic information further includes: discontinuing to display one of: the incomplete entry notification indicating the user has not been entered into the giveaway, the entrance verification indicating the user has successfully been entered into the giveaway, or the visual restrictions indicating the user is excluded from entering the giveaway; displaying an expiration confirmation indicating the giveaway has ended; continuing to display at least one of: the prize value for the giveaway, the prize value defined by the giveaway data, or the number of winners for the giveaway, the number of winners defined by the giveaway data; and displaying a personal winning notification notifying the user they have won the giveaway; and detecting a rollover action on the virtual button; in response to detecting the rollover action: discontinuing to display the expiration confirmation indicating the giveaway has ended; and either: displaying a winner notification prompting the user to interact with the virtual button to view user-data for the winning user of the giveaway, or displaying user-data for the winning user of the giveaway.

In some cases, the social media feed is provided by a social media platform and wherein at least one of the plurality of posts is included in a social media feed of multiple distinct users, wherein the dynamic virtual button is presented in the social media feed of the multiple distinct users and is updated for each of the multiple distinct users in response to each of the distinct users interacting with the dynamic virtual button in the social media feed.

In particular aspects, the social media feed is provided by a social media platform and wherein at least one of the plurality of posts is included in a social media feed of multiple distinct users, wherein the dynamic virtual button is presented in the social media feed of the multiple distinct users, the method further comprising: providing an interface enabling at least one user to create a post to the social media feed, the interface including a giveaway toggle that enables the at least one user to create the giveaway prior to publishing the giveaway to the social media feed, in response to interaction with the giveaway toggle, displaying a giveaway prompt for data defining the giveaway.

In certain cases, the method further includes, in response to user interaction with the giveaway prompt, providing a publication prompt to publish the giveaway in the post in the social media feed.

In particular aspects, the giveaway data includes a prize value, a number of winners to be selected in the giveaway, and an end date/time for the giveaway.

In some implementations, the giveaway data further includes user-based actions to be performed by participating users in the giveaway, wherein the user-based actions are defined by capabilities of the social media feed.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

This disclosure is based, at least in part, on the realization that a single virtual button can be used to dynamically display information to a user, e.g., in an interface such as a graphical user interface (GUI). For example, to simplify the displaying of information and improve a user's experience with various platforms and apps, a single, virtual button capable of dynamically displaying information to a user is used. As discussed herein, the disclosure relates generally to displaying information, and more particularly, to virtual buttons, methods, and program products for dynamically displaying information relating to a giveaway.

These and other embodiments are discussed below with reference to FIGS. 1-21. However, those skilled in the art will readily appreciate that the detailed description given herein with respect to these Figures is for explanatory purposes only and should not be construed as limiting.

Figure 1:
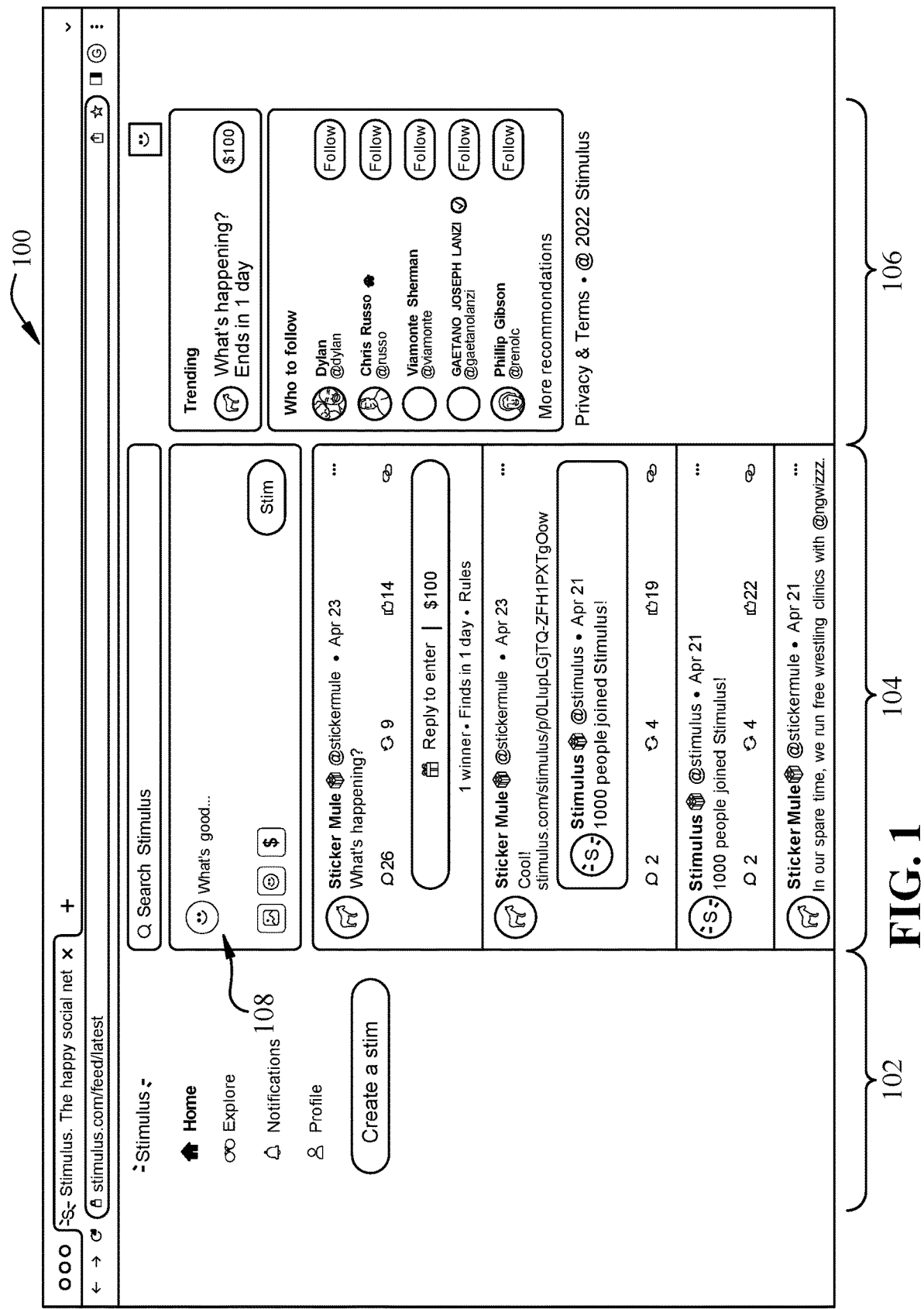
FIG. 1 shows an illustrative view of a social media platform, according to embodiments of the disclosure.

FIG. 1 shows an illustrative view of a social media platform 100 (hereafter, "platform 100"). In the non-limiting example shown in FIG. 1, platform 100 may include the popular social media platform "Stimulus" (www.stimulus.com) which allows users to create content (e.g., text, media, multi-media, etc.), upload content, view content, and/or engage other users on the platform 100. Terms such as "Stim" and "Re-Stim" (or ReStim) used herein can refer to the Stimulus social media platform, posts on the Stimulus platform, sharing of social media posts on the Stimulus platform, etc. While various aspects are described in the context of the popular Stimulus platform, it is understood that platform 100 may be any social media platform that allows one or more users to interact with both the platform 100 and one or more other users during operation. As shown in FIG. 1, platform 100 may include a menu section 102, a live feed section 104, and a trending section 106. Menu section 102 may provide the user of platform 100 the ability to navigate between one or more pages on the platform 100 via one or more corresponding Uniform Resource Locators (hereafter, "URL"), such as a home screen, an explore page (e.g., provides real-time updates of content on platform 100), a notifications page, and the user's own profile. Additionally, menu section 102 may enable the user to create a post or Stim (hereafter referred to as a "Stim") for public display and dissemination. Live feed section 104 may include a visual of recent Stims published by the user and/or distinct users which the navigating user follows or likes. Trending section 106 provides user accounts, topics, and/or Stims that may be popular and/or trending within platform 100, as well as suggested users to follow within platform 100.

Figure 2:
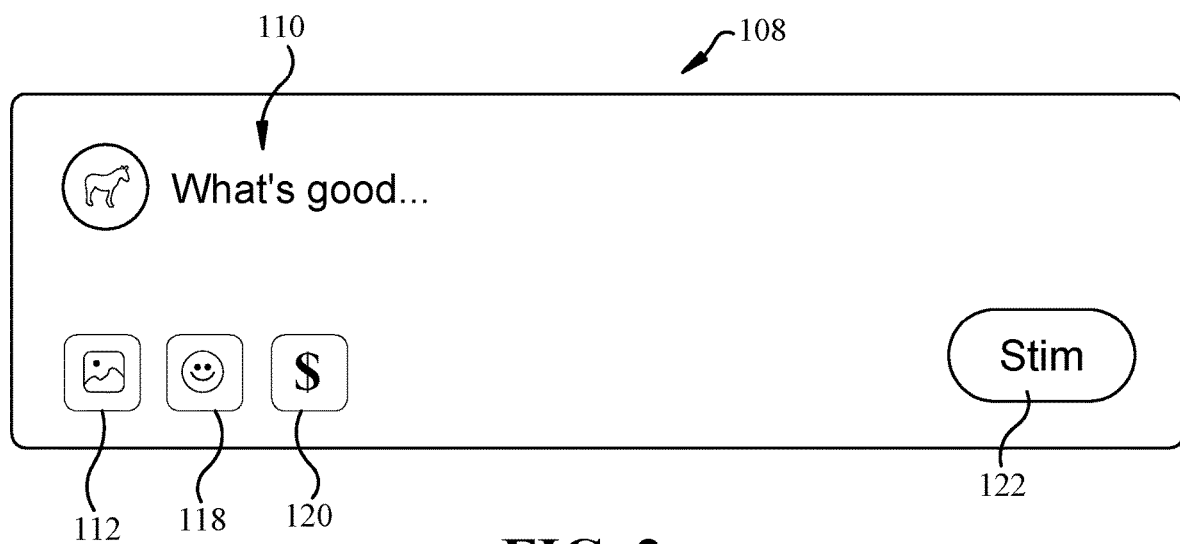
FIG. 2 shows an illustrative view for creating a Stim on the platform of FIG. 1, according to embodiments of the disclosure.

As further shown in FIG. 1, platform 100 may include a Stim creation portion 108. In the non-limiting example shown, Stim creation portion 108 may be positioned within live feed section 104. In other non-limiting examples Stim creation portion 108 may be positioned in any portion of platform 100 and/or may form a separate pop-up window once interacted with in platform 100. Turning to FIG. 2, and with continued reference to FIG. 1, Stim creation portion 108 of platform 100 may allow a user to create a Stim (see, FIG. 6) with various inputs and/or options. Stim creation portion 108 may include, among other things, one or more of the following features: a text field 110, an image toggle 112, an emoji toggle 118, a giveaway toggle 120, and a button 122. Text field 110 may enable a user to provide textual input to be published and visible in the Stim. Image toggle 112 may enable a user to insert photos, videos, and/or other media into the Stim. Emoji toggle 118 may enable a user to insert an emoji(s) into the Stim. Giveaway toggle 120 may enable a user to create a giveaway associated with the Stim, as discussed in detail herein. Once the Stim is complete, the user may click or interact with the "Stim" button 122 to publish the Stim (see, FIG. 6) for users to view and interact with publicly. In certain cases, publishing the Stim can make that posting (e.g., Stim) live to all other users of the platform 100, e.g., followers, groups of followers, public groups, etc. In some cases, a Stim cannot be edited by the user after publishing. In other cases, a Stim can be edited or revised after publishing. Stim creation portion 108 may include additional inputs and/or options that may be added by users. For example, Stim creation portion 108 may provide users the ability to add gifs (not shown), memes (not shown), direct user-tags (e.g., "@username"), geo-location tags, questions, links to websites, web-based avatars, polls, and/or other suitable social media based inputs where users of the platform may interact, engage, and/or be provided with additional visualizations beyond user generated-text or messages.

Giveaway toggle 120 allows users to attach, include, create, and/or generate a giveaway that may be included and/or associated with the Stim published by the user. As used herein, the term "giveaway" can refer to a contest, competition, or other reward-based activity for entry, submission, or consideration. In a particular example, a giveaway can be part of a promotional effort by a one or more users or an organization to engage an audience, e.g., by rewarding participants with a prize or other reward. In further examples, a promoter of the giveaway can define a reward, prize, etc., for one or more users to claim via entry, such as via a social media platform like Stimulus. As noted herein, the giveaway may or may not be limited in terms of items offered as prizes, number of winners, whether a winner will be selected or otherwise qualify, etc.

Figure 3:
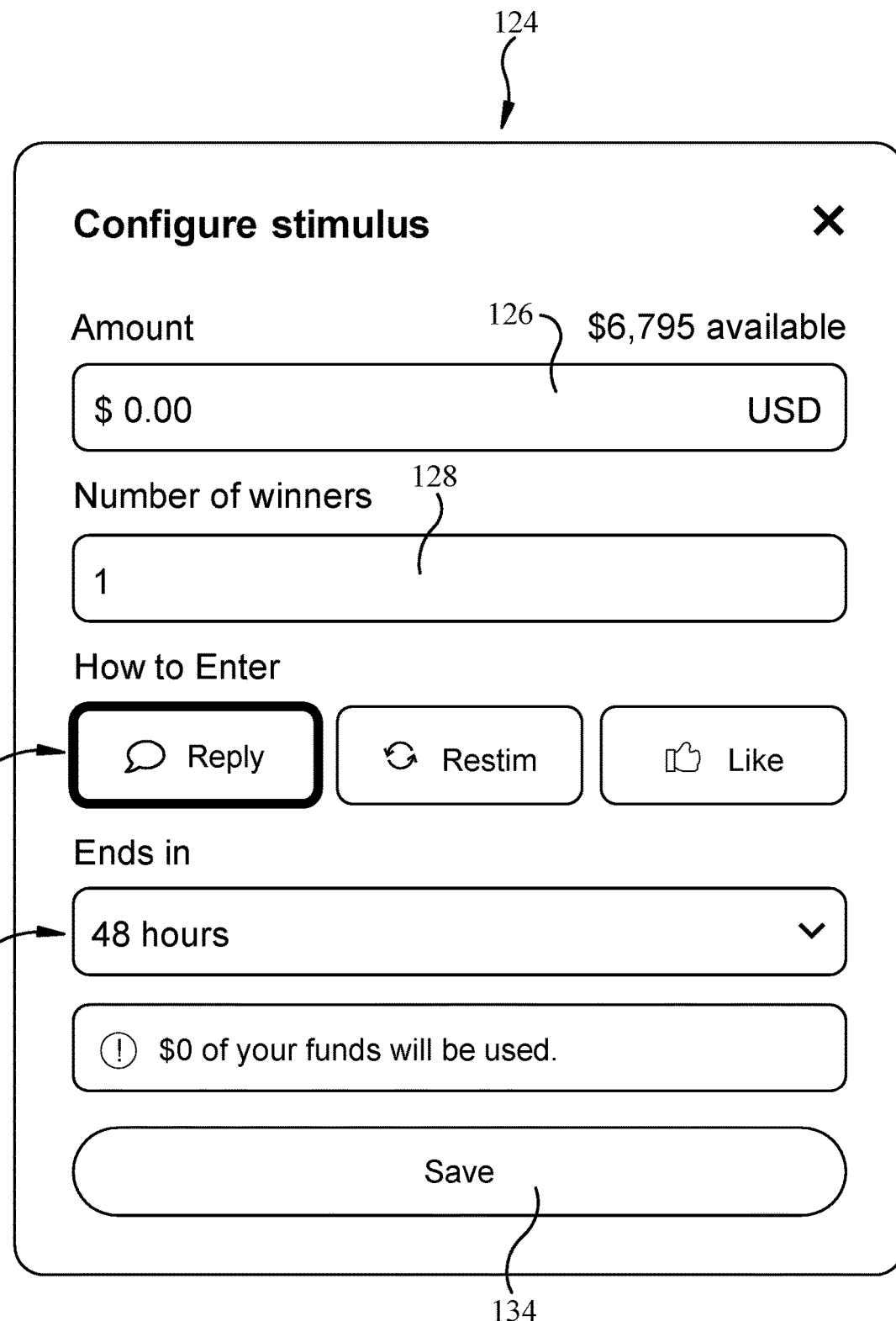
FIGS. 3 and 4 show illustrative views of a fillable giveaway prompt including giveaway data relating to a giveaway to be included on a Stim on the platform of FIG. 1, according to embodiments of the disclosure.
Figure 4:
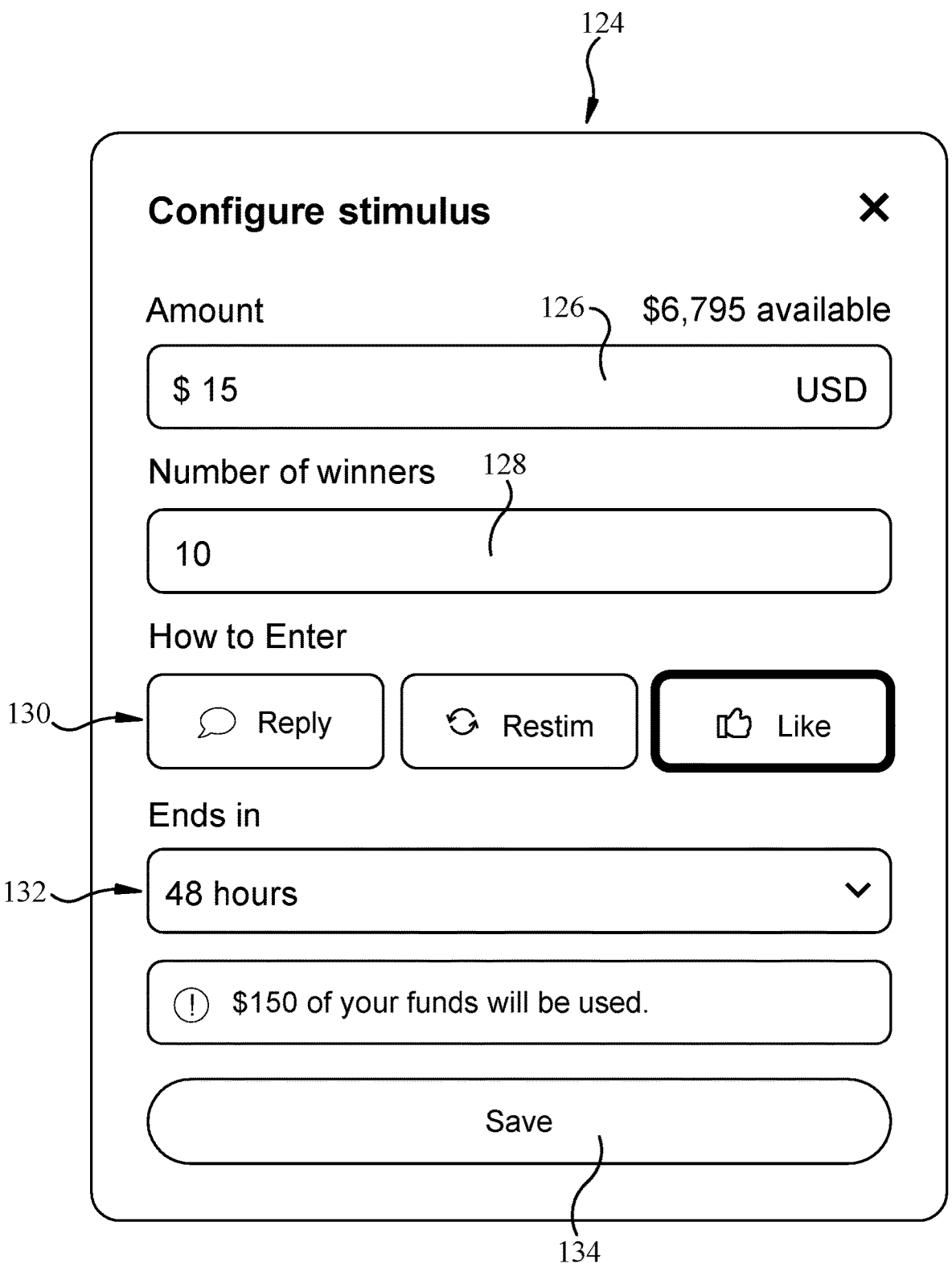

When attaching or creating a giveaway to be included with a Stim, the user may provide various giveaway data specific to the giveaway, which in turn may facilitate the generation of a single, virtual button that may dynamically provide information to the user over the duration of and at the end of the giveaway, as discussed herein. Turning to FIGS. 3 and 4, a non-limiting example of a giveaway prompt 124 is shown. Giveaway prompt 124 may be provided to the user in response to the user interacting, engaging, and/or clicking the giveaway toggle 120 in Stim creation portion 108 (see, FIG. 2). Giveaway prompt 124 may provide the user creating the Stim including the giveaway to provide giveaway data relating to and/or associated with the giveaway itself. In the non-limiting example shown, giveaway data associated with the giveaway may include a prize value 126, a number of winners 128 to be selected in the giveaway, user-based actions 130 to be performed by participating users to enter the giveaway, and an end date/time 132 for the giveaway. Prize value 126 and number of winners 128 may be provided by the user via a numerical input, where the prize for the giveaway is monetary. User-based actions 130 to be performed by users to participate or enter the giveaway may be dependent, at least in part, on platform 100 and the functional limitations thereof. In the example shown in FIGS. 3 and 4, user-based actions 130 for platform 100 may include replying to the Stim that includes the giveaway (see, FIG. 6), reposting or Re-stim (hereafter referred to as a "Restim") the Stim including the giveaway within platform 100, or liking the Stim including the giveaway. Additional user-based actions 130 may also include Restim or reposting the Stim including the giveaway in a third party or distinct social media platform (not shown), and/or following the user sponsoring, generating and/or creating the Stim that includes the giveaway (not shown). In still further examples (not shown), user-based actions 130 may include responding to a question or poll generated in the Stim including the giveaway, submitting a picture or video in response to the Stim including the giveaway, watching a video included in the Stim, or engaging with a link included in the Stim. End date/time 132 of the giveaway data may be selected from predetermined amounts of time by the user creating the Stim including the giveaway.

As shown in FIGS. 3 and 4, prize value 126 and number of winners 128 may be configured as fillable text boxes, user-based actions 130 may be configured as selectable radio buttons, and end date/time 132 may be configured as a selectable dropdown list. However, it is understood that the user input, predetermined giveaway data (e.g., 124-132) may be provided to the user using any suitable data selection/input devices or means. Once complete, the user creating the Stim including the giveaway may click a save button 134, and proceed to reviewing the Stim prior to publication within platform 100.

Figure 5:
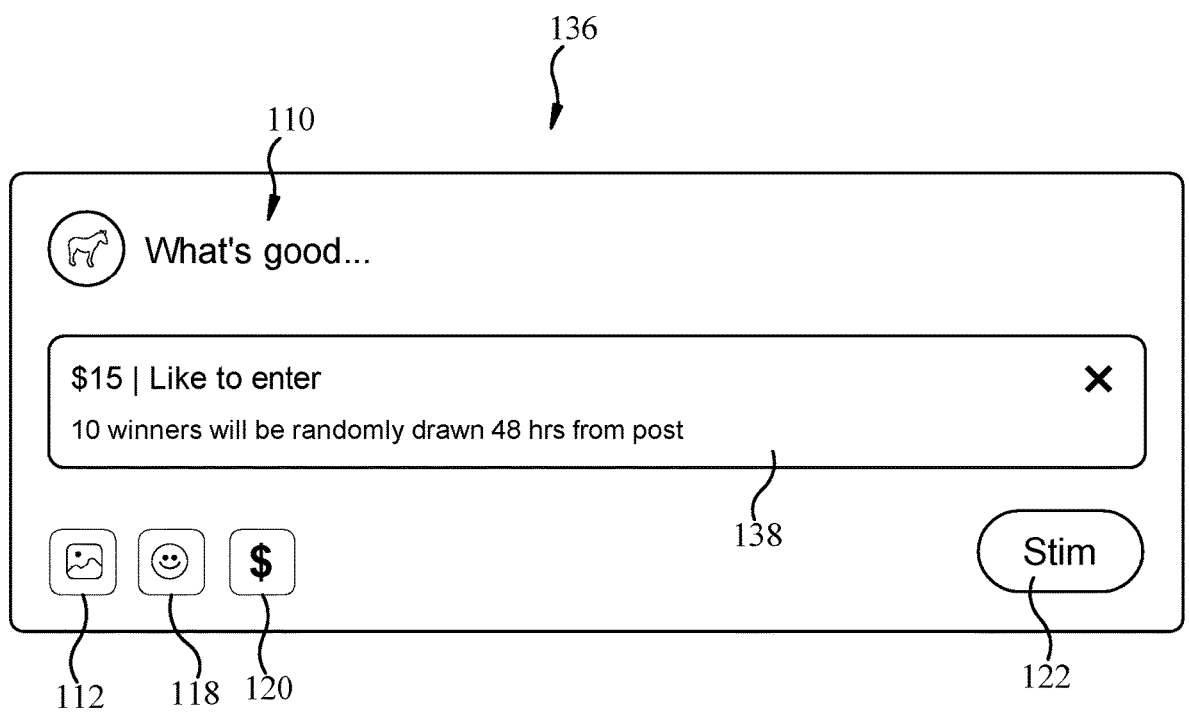
FIG. 5 shows an illustrative view of a review page for the Stim including the giveaway of FIGS. 3 and 4, according to embodiments of the disclosure.

FIG. 5 shows a Stim review portion 136 of the created Stim including the giveaway. As shown, Stim review portion 136 may include substantially similar portions and/or components as Stim creation portion 108. It is understood that similarly numbered and/or named components may function in a substantially similar fashion. Redundant explanation of these components has been omitted for clarity.

Distinct from Stim creation portion 108, however, Stim review portion 136 may create a preview 138 of the virtual button and/or the giveaway data associated with the giveaway included in the Stim that may be presented to a user of platform 100. In the non-limiting example shown in FIG. 5, the giveaway data visually presented to the user may be substantially similar to the data provided in giveaway prompt 124. For example, preview 138 may display giveaway data including prize value 126, a number of winners 128 to be selected in the giveaway, user-based actions 130 to be performed by participating users to enter the giveaway, and an end date/time 132 for the giveaway (see, FIGS. 3 and 4). Once finalized, a user may click or interact with "Stim" button 122 to publish the Stim including the giveaway for users to view and interact with publicly, as discussed herein.

Figure 6:
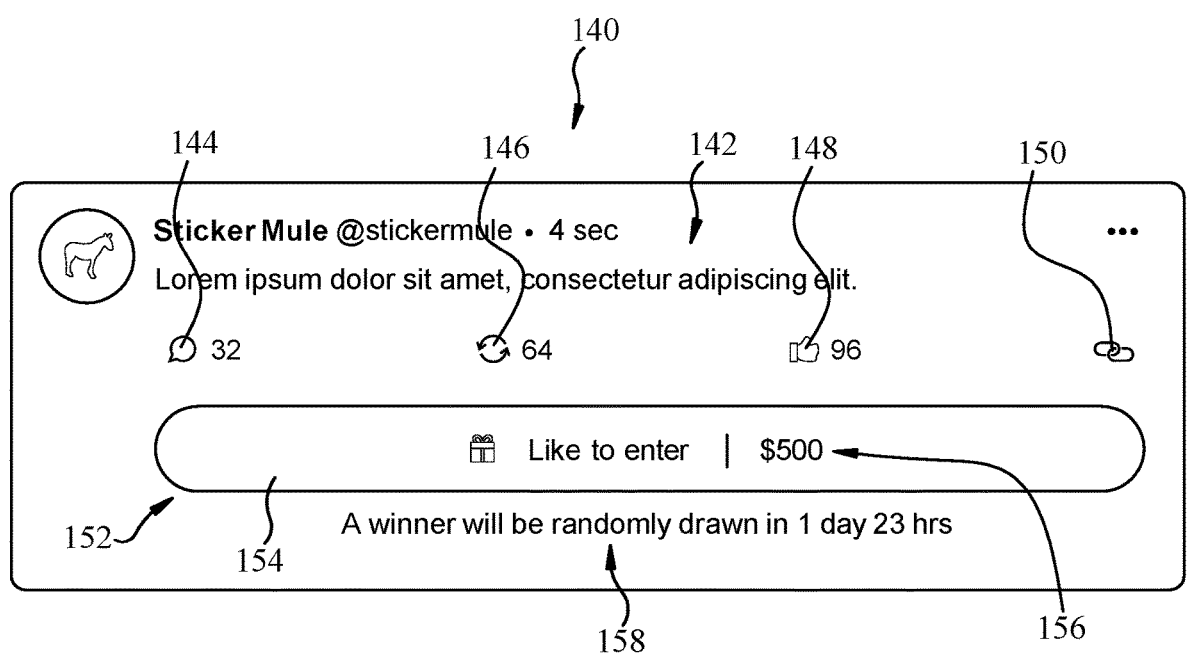
FIG. 6 shows an illustrative view of a virtual button generated for the Stim including the giveaway as shown in FIGS. 3 and 4, where the virtual button displays a first set of information of dynamic information prior to a user interacting with the virtual button, according to embodiments of the disclosure.

FIG. 6 shows a non-limiting example of a published Stim 140 including a giveaway. Stim 140 may include various portions that may be published and/or visible, as well as interactive, to a user of platform 100. Stim 140 may include, for example, one or more of the following: visible text 142 that corresponds to user input in text field 110 (see, FIG. 2); a reply toggle 144 configured to enable one or more users of the platform 100 to reply or comment on the Stim 140; a Restim toggle 146 configured to enable one or more users to repost (e.g., Restim) the Stim 140; a "like" toggle 148 configured to enable a user to "like" the Stim 140; and a link or share toggle 150 configured to enable a user to disseminate the Stim 140 outside of the platform 100 (e.g., in a distinct social media platform). Although various toggles 144-150 are shown in Stim 140, it is understood that Stim 140 and/or platform 100 may determine, at least in part, the amount and variety of toggles presented to the user in each published Stim. In certain cases, actuating one or more of the toggles 144-150 can automatically perform an action, e.g., "like" toggle 148 automatically provides a visual indicator that the user has promoted or "liked" the Stim 140, and Restim toggle 146 automatically shares the Stim 140 with followers or other users associated with the user in response to actuation. In still other cases, actuating one or more of the toggles 144-150 provides a prompt to the user to take another action, e.g., reply toggle 144 presents the user with a dialog box to enter text replying to the Stim 140. A user of platform 100 may engage, interact and/or click any and all toggles 144-150 included in Stim 140 to engage with platform 100 as intended. As discussed herein, user-based actions may also be performed in order for the user to participate or enter the giveaway associated with or included in Stim 140.

As further shown in FIG. 6, the Stim 140 may include a virtual button 152 that is generated within and/or with Stim 140 based at least in part on the giveaway prompt 124 (see, FIG. 3) and/or the publication of Stim 140 within platform 100. For example, when a user desires to include a giveaway (e.g., a competition with a prize) within Stim 140, the virtual button 152 associated with the giveaway may be generated, included, displayed and/or otherwise associated with the Stim 140. As discussed herein, virtual button 152 may dynamically display information relating to the giveaway associated with Stim 140 throughout the duration of the giveaway and/or after the giveaway has ended or expired. Dynamic information displayed on virtual button 152 throughout the giveaway may be based on, at least in part, the predetermined giveaway data provided by the user and giveaway prompt 124 (see, FIG. 3) prior to the publication of Stim 140 including the giveaway and virtual button 152. Virtual button 152 may include an interactive body 154 configured to display dynamic information.

As shown in FIG. 6, the virtual button 152 may be configured to dynamically display a first set of information 156 relating to the giveaway. The first set of information 156 of the dynamic information may be displayed on the interactive body 154 of virtual button 152 based on one or more user interactions, or lack of interaction, with virtual button 152. In the non-limiting example shown in FIG. 6, Stim 140 including virtual button 152 may be presented, shown, and/or depicted prior to a user's interaction with interactive body 154 of virtual button 152. The result of the user not yet interacting with virtual button 152, interactive body 154 of virtual button 152 may display, depict, and/or visually present first set of information 156. As shown, first set of information 156 displayed on virtual button 152 may include, but is not limited to, a prize value for the giveaway, and user action instructions to enter the giveaway associated with Stim 140. In this example, the prize value for the giveaway and the user action instructions displayed on virtual button 152 may correspond and/or correlate with prize value 126 and user-based actions 130, respectively, as predetermined by the giveaway data (see, FIG. 3). In other non-limiting examples discussed herein (see, FIGS. 13 and 15), first set of information 156 displayed on interactive body 154 of virtual button 152 may include additional, predefined prize or giveaway data.

As further shown in FIG. 6, the Stim 140 may also include a time counter 158. In the non-limiting example shown in FIG. 6, time counter 158 may be positioned adjacent virtual button 152. Time counter 158 may identify an end of the giveaway, and may dynamically change (e.g., countdown) during the course of the giveaway. Time counter 158 may be defined by the giveaway data provided by the user in end date/time 132 of giveaway prompt 124 (see, FIG. 3). In other non-limiting examples discussed herein, time counter 158 may not be displayed separate from virtual button 152, but rather may be displayed within interactive body 154 of virtual button 152 (see, FIG. 14).

A user of platform 100 may interact with virtual button 152 in order to enter the giveaway associated with Stim 140. More specifically, a user may interact, engage, and/or "click" virtual button 152 in order to participate or properly enter the giveaway in order to potentially be deemed a winner. By clicking virtual button 152, the user-based action defined by the user sponsoring the giveaway in Stim 140 may be automatically performed. For example, and as shown in FIG. 6, user-based instructions included in first set of information 156 may include "Like to enter"—as displayed on virtual button 152. As such, and upon interacting or clicking on virtual button 152, Stim 140 may be automatically liked by the user (see, FIG. 7) (e.g., no need for user to click like toggle 148), and the user may be entered into the giveaway, if no restrictions apply as discussed herein.

Figure 7:
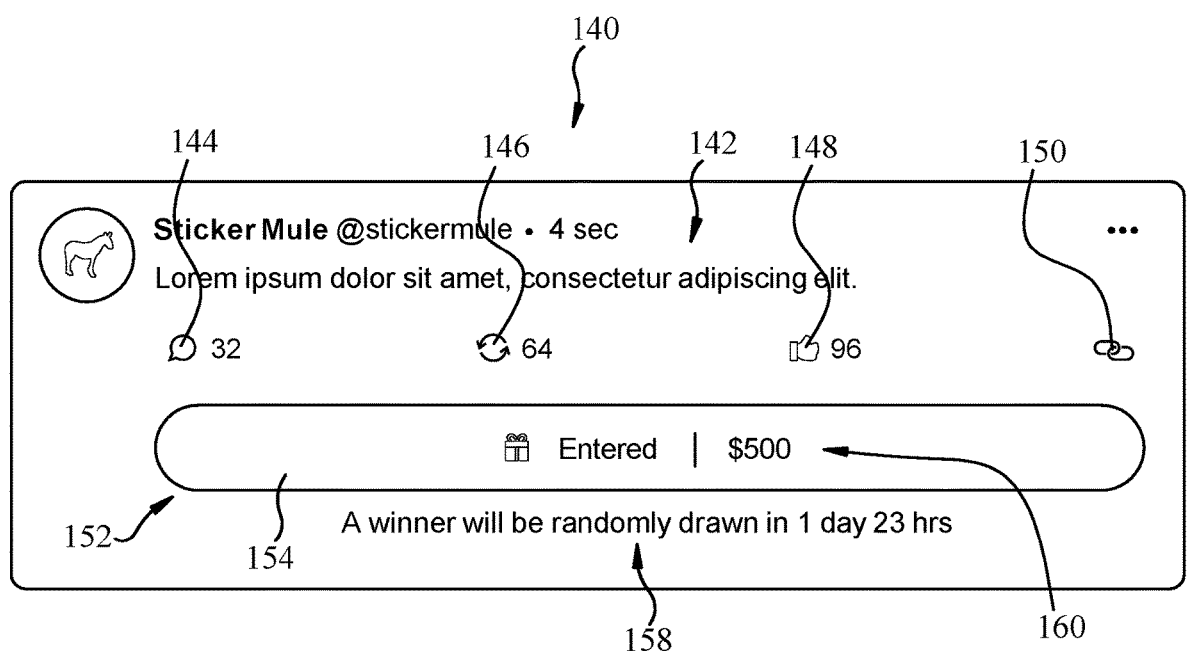
FIG. 7 shows an illustrative view of the virtual button of FIG. 6 including a second set of information of dynamic information after the user interacts with the virtual button, according to embodiments of the disclosure.

FIG. 7 shows a non-limiting example of Stim 140 and virtual button 152 after the user interacts with virtual button 152. More specifically, after a user interacts, engages, and/or "clicks" virtual button 152, user-based actions, as predetermined by the user in giveaway prompt 124 (see, FIG. 3), may be automatically performed. In the non-limiting example, Stim 140 may be provided with a "like" status upon interacting with virtual button 152, as indicated by the highlighting, lighting-up, and/or alteration to like toggle 148 of Stim 140.

In addition to automatically performing the user-based action upon interacting with virtual button 152, the dynamic information displayed on interactive body 154 of virtual button 152 may also be altered, changed, and/or modified. That is, after the user interacts with virtual button 152, interactive body 154 of virtual button 152 may display a second set of information 160 and/or may replace the previously displayed first set of information 158. At least a portion of second set of information 160 displayed on virtual button 152 may be substantially similar to a portion of first set of information 156 displayed on virtual button 152 prior to the user interaction. For example, second set of information 160 shown in FIG. 7 may continue to display the prize value as determined by the predetermined giveaway data (e.g., prize value 126—FIG. 3). In the non-limiting example shown, the user may have successfully entered and/or become a participant of the giveaway included in Stim 140. As such, second set of information 160 may include entrance verification indicating that the user has successfully been entered into the giveaway ("Entered"). In other non-limiting examples discussed herein (see, FIG. 15), second set of information 160 may include a visual restriction indicating the user is excluded from entering the giveaway associated with Stim 140 when applicable. As discussed herein, the visual display and/or the adjustment of the dynamic information displayed on virtual button 152 after the user interacts with button 152 may be accomplished automatically. Additionally, and to remind the user that they have already entered the giveaway and/or to prevent the user from illegally entering the giveaway more than once, virtually button 152 may continue to display second set of information 160 until the giveaway associated with Stim 140 has ended.

Figure 8:
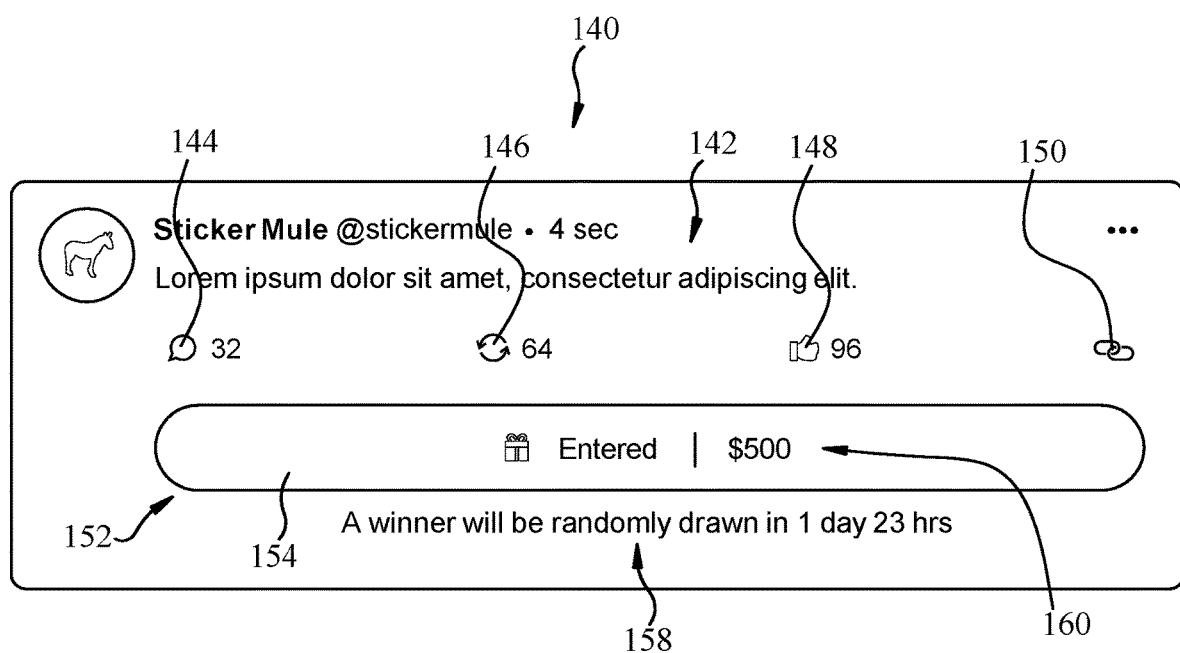
FIG. 8 shows an illustrative view of the virtual button of FIG. 6 including a second set of information of dynamic information after the user interacts with the virtual button, according to additional embodiments of the disclosure.

FIG. 8 shows another non-limiting example of Stim 140 and virtual button 152 after the user interacts with virtual button 152. More specifically, after a user interacts, engages, and/or "clicks" virtual button 152, user-based actions, as predetermined by the user in giveaway prompt 124 (see, FIG. 3), may be automatically performed. In the non-limiting example, Stim 140 may be provided with a "Restim" status upon interacting with virtual button 152, as indicated by the highlighting, lighting-up, and/or alteration to Restim toggle 146 of Stim 140.

Figure 9:
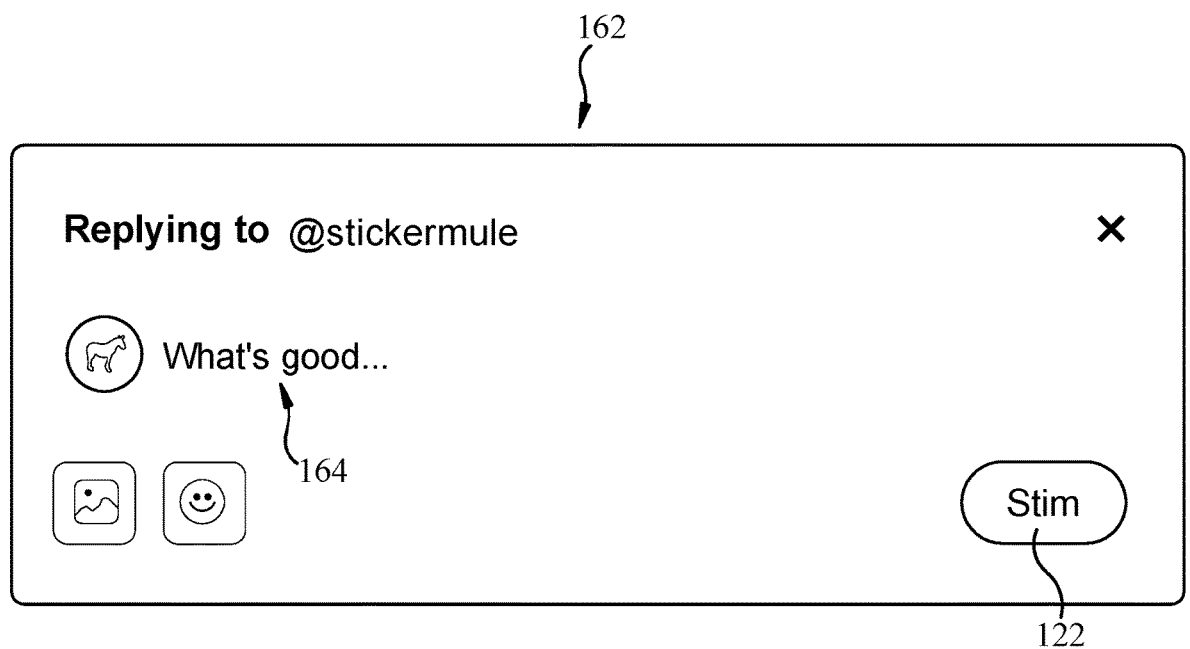
FIG. 9 shows an illustrative view of a reply message box after the user interacts with the virtual button of FIG. 6, according to embodiments of the disclosure.

FIG. 9 depicts a comment or reply pop-up window 162 which may be automatically provided to the user upon interacting with virtual button 152 to enter or participate in the giveaway associated with Stim 140. In this non-limiting example, reply pop-up window 162 may be automatically provided to the user when the user interacts, engages, and/or clicks virtual button 152 and the user-based action as defined by the giveaway data requires the user to comment or reply to Stim 140. Reply pop-up window 162 may provide a reply text field 164 to add personal text to the reply. Once the user provides text and clicks "Stim" button 122, the reply to Stim 140 may be published. Additionally, virtual button 152 may be adjusted to display second set of information 160 on interactive body 154 of virtual button 152, as similarly shown in FIG. 7 or 8.

Figure 10:
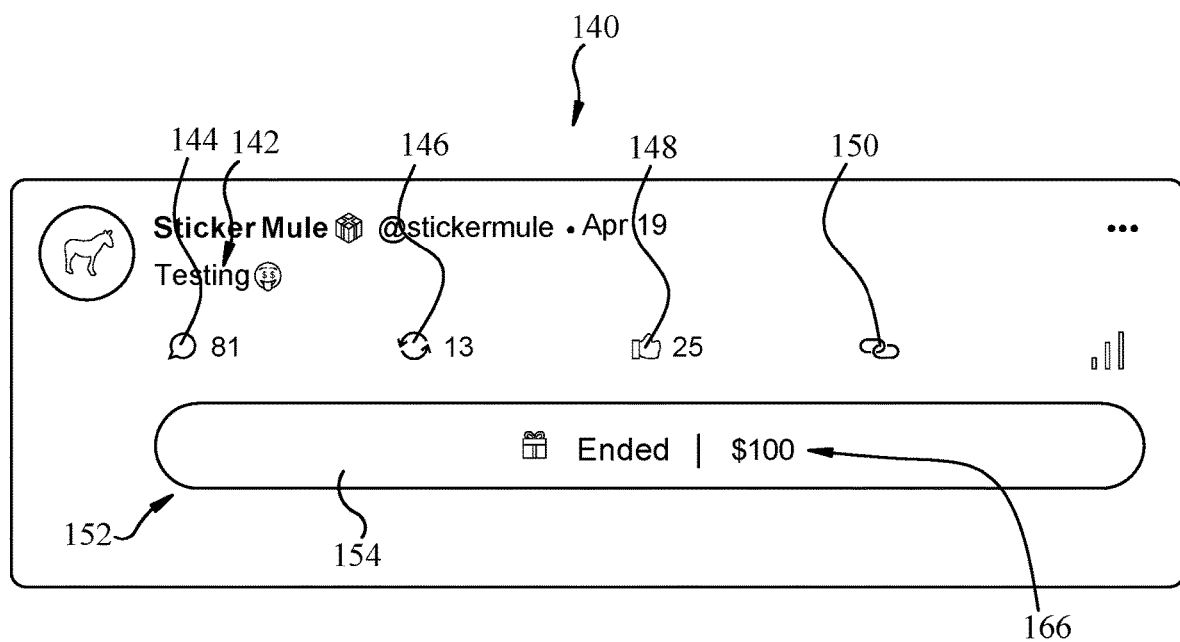
FIG. 10 shows an illustrative view of the virtual button of FIG. 6 including a third set of information of dynamic information after the giveaway has ended, according to embodiments of the disclosure.

FIG. 10 shows Stim 140 after the associated giveaway has ended. In the non-limiting example, the dynamic information displayed on interactive body 154 of virtual button 152 may be further adjusted in response to determining that the giveaway included in Stim 140 has ended or expired, as provided by the predetermined giveaway data (see, FIG. 3). More specifically, the second set of information 160 may no longer be displayed on virtual button 152, and now a third set of information 166 may be displayed on interactive body 154 of virtual button 152 in the second set of information's 160 place.

Similar to the first set of information 156 and second set of information 160, at least a portion of third set of information 166 displayed on virtual button 152 may be substantially similar to a portion of second set of information 160 displayed on virtual button 152 prior to the end or expiration of the giveaway. For example, third set of information 166 shown in FIG. 10 may continue to display the prize value as determined by the predetermined giveaway data (e.g., prize value 126—FIG. 3). Because the giveaway associated with Stim 140 has ended, third set of information 166 may include expiration confirmation indicating the giveaway has ended for all users ("Ended"). As discussed herein, the visual display and/or the adjustment of the dynamic information displayed on virtual button 152 after the giveaway has ended may be accomplished automatically. Additionally, and to remind the user that they may no longer enter or participate in the giveaway, virtually button 152 may continue to display third set of information 166 indefinitely.

Figure 11:
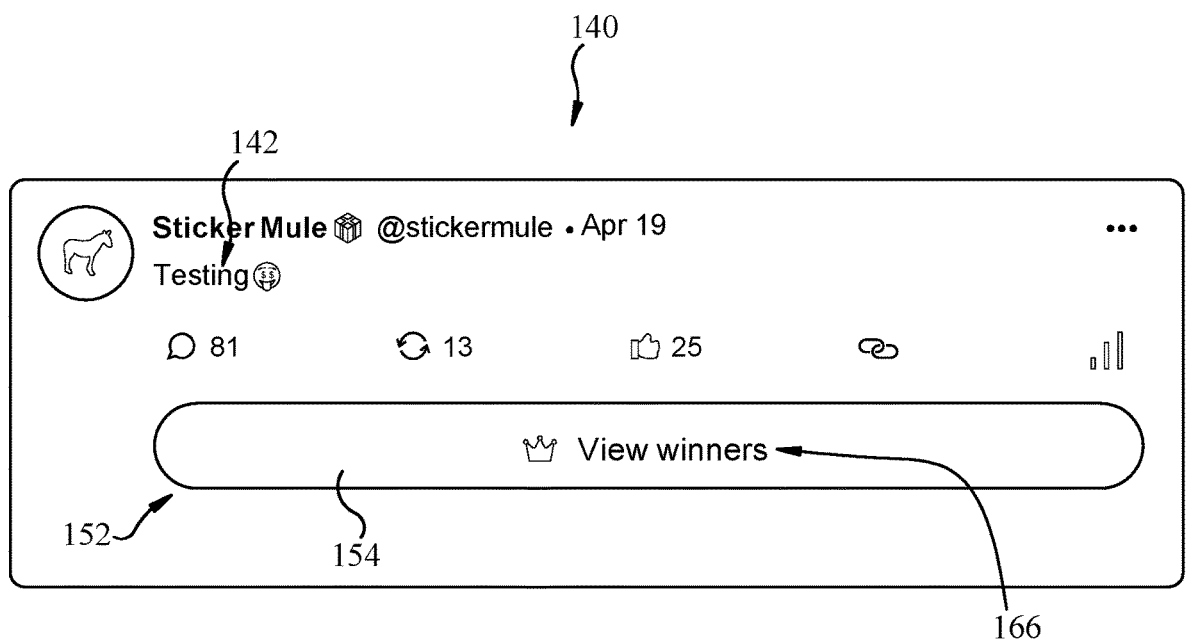
FIG. 11 shows an illustrative view of the virtual button of FIG. 6 including a third set of information of dynamic information after the giveaway has ended and the user performs a rollover action on the virtual button, according to embodiments of the disclosure.
Figure 12:
FIG. 12 shows an illustrative view of a pop-up including the winners of the giveaway after the user interacts with the virtual button of FIG. 10 including the third set of information, according to embodiments of the disclosure.
Figure 12:
Figure 12:
Figure 12:
Figure 12:
Figure 12:
Figure 12:

FIG. 11 shows another non-limiting example of virtual button 152 included in Stim 140 after the associated giveaway has ended. Specifically, in the example shown, the third set of information 166 may dynamically change or be altered in response to additional interactions by the user of platform 100. For example, when a user performs a rollover action on interactive body 154 of the virtually button 152 using an indicator component (e.g., mouse, cursor, stylus, finger, etc.), the dynamic information included in third set of information 166 displayed on virtual button 152 may be further altered, adjusted, and/or changed. As shown in FIG. 11, upon detecting the rollover action, third set of information 166 may also include a winner notification ("View winners"). The winner notification may prompt the user to further engage, interact, and/or "click" on virtual button 152 to view user-data for the winning user(s) of the giveaway associated with Stim 140. Briefly, turning to FIG. 12, a non-limiting example of a winner(s) pop-up window 168 may be provided to the user upon interacting with virtual button 152 displaying the third set of information 166 as shown in FIG. 11. In other non-limiting examples discussed herein (see, FIG. 17), the winners/user-data associated with the winners of the giveaway may be depicted, visually provided, and/or displayed adjacent virtual button 152 or directly on interactive body 154 of virtual button 152.

In still further examples, third set of information 166 displayed on virtual button 152 may include the winner notification only, as similarly shown in FIG. 11. That is, upon the expiration of the associated giveaway, virtual button 152 may not display the expiration confirmation indicating the giveaway has ended for all users ("Ended"), as shown, for example, in FIG. 10. Rather, the third set of information 166, automatically adjusted on virtual button 152 at the expiration of the associated giveaway, may display, include, and/or provide the winner notification ("View winners"). As similarly discussed herein, virtually button 152 may continue to display third set of information 166 indefinitely to remind the user that they may no longer enter or participate in the giveaway.

Figure 13:
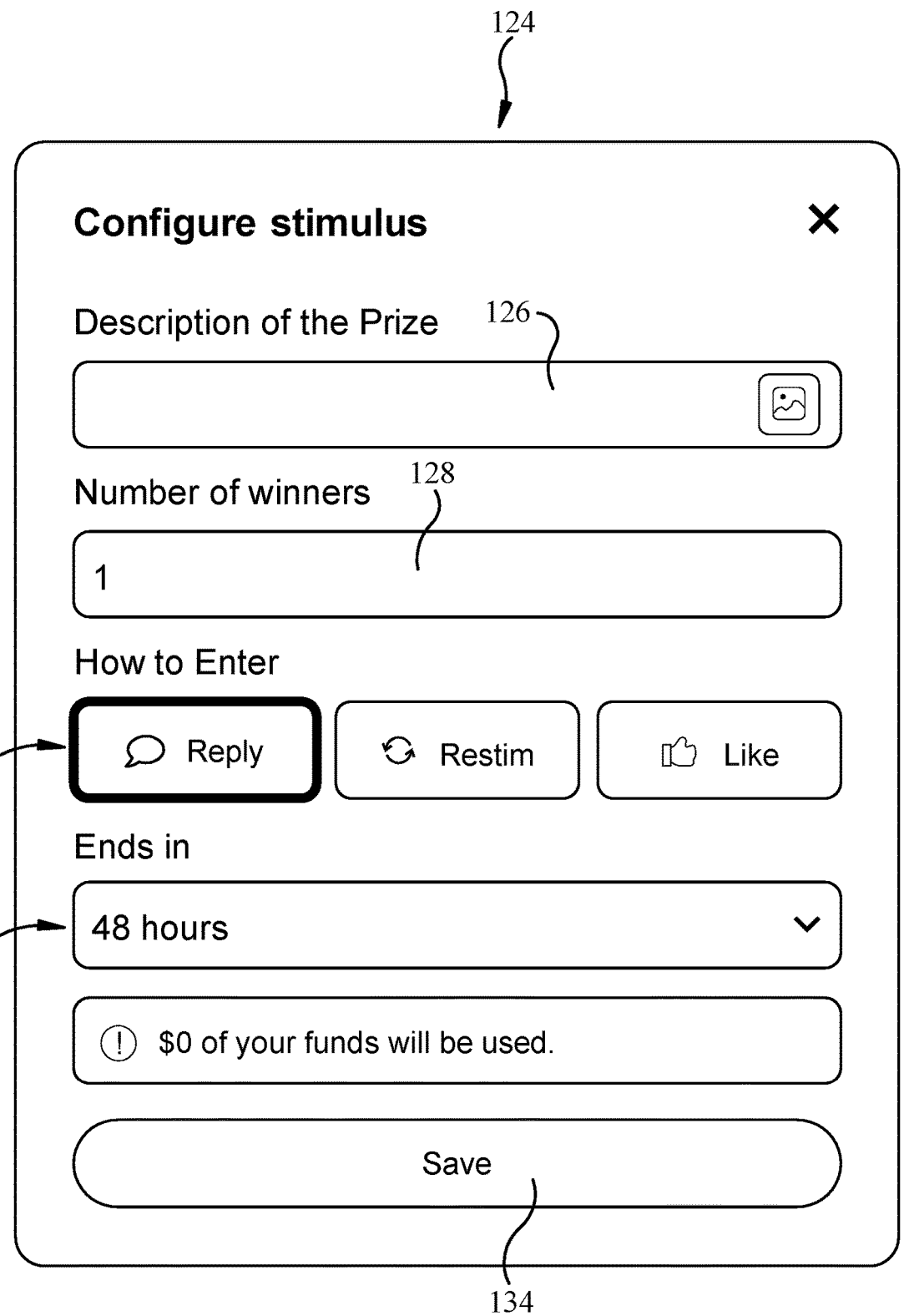
FIG. 13 shows an illustrative view of a fillable giveaway prompt including giveaway data relating to a giveaway to be included on a Stim on the platform of FIG. 1, according to additional embodiments of the disclosure.

Although shown and discussed herein as being a monetary or cash prize, it is understood that prize value 126 of giveaway prompt 124 (see, FIG. 3) may also incorporate a physical or actual prize as well. That is, a user of platform 100 that may create the giveaway using giveaway prompt 124 may choose to give away or offer a physical prize to the winner of the giveaway. For example, the user may utilize giveaway prompt 124 to offer a free t-shirt as prize value 126. In a non-limiting example shown in FIG. 13, giveaway prompt 124 may initial provide the user with the option to offer a monetary prize or a physical prize for prize value 126 of the created giveaway. Where prize value 126 is designated as a physical prize, prize value 126 field of giveaway prompt may be configured as fillable text box so user may provide a written description of the physical prize. Additionally, giveaway prompt 124 may also provide the user with the ability to upload or include a photo displaying the physical prize.

In the event that prize value 126 for the giveaway is a physical prize, additional communications may be beneficial between the user generating the giveaway and the winner. That is, winners of the giveaway may need to be subsequently contacted by the user generating the giveaway to obtain additional information pertaining to the physical prize. Continuing the example above, when a winner is selected, the user generating the giveaway may message the winner to obtain their shirt size, and their home address for shipping purposes. In other non-limiting examples, the user generating the giveaway may ask users, via a question or poll, to select their shirt size while the giveaway is active. In this example, some of the winner's information or preference (e.g., shirt size) may already be known to the user.

Figure 14:
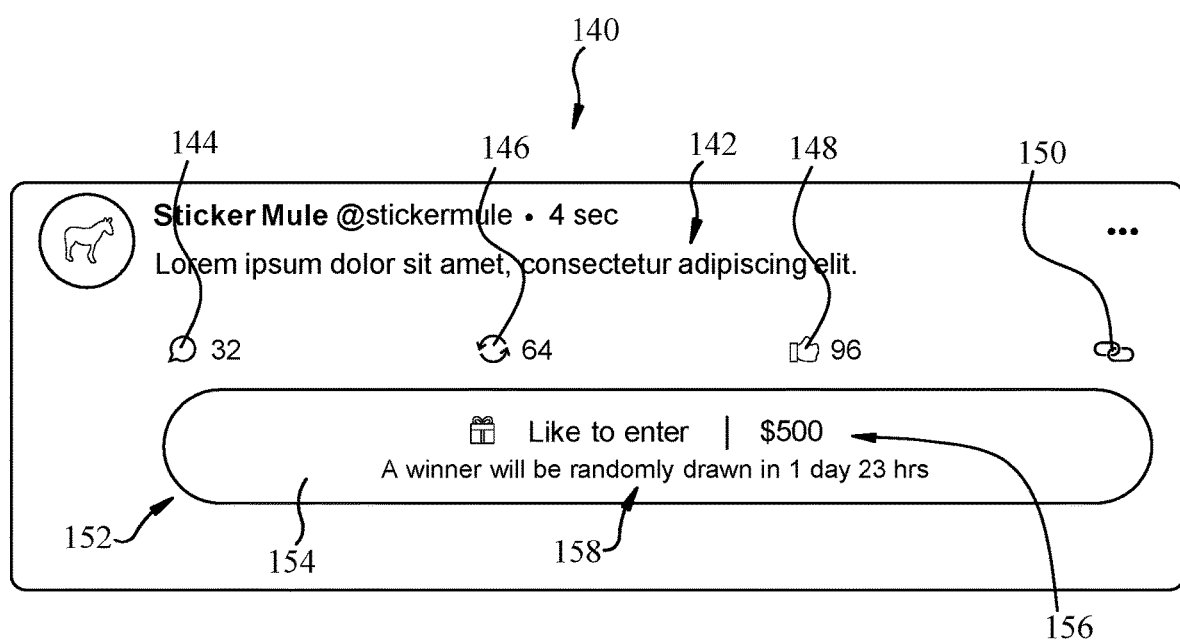
FIG. 14 shows an illustrative view of a virtual button generated for a Stim including the giveaway where the virtual button displays a first set of information of dynamic information prior to a user interacting with the virtual button, according to additional embodiments of the disclosure.

FIG. 14 shows another non-limiting example of Stim 140 including virtual button 152 generated for the giveaway. It is understood that similarly numbered and/or named components may function in a substantially similar fashion. Redundant explanation of these components has been omitted for clarity.

As shown in FIG. 14, first set of information 156 may include additional dynamic information when compared to FIG. 6. In this non-limiting example, first set of information 156 displayed in interactive body 154 of virtual button 152 may include time counter 158 to identify an end of the giveaway. As discussed herein, time counter 158 displayed in virtual button 152 may dynamically change (e.g., countdown) during the course of the giveaway.

Figure 15:
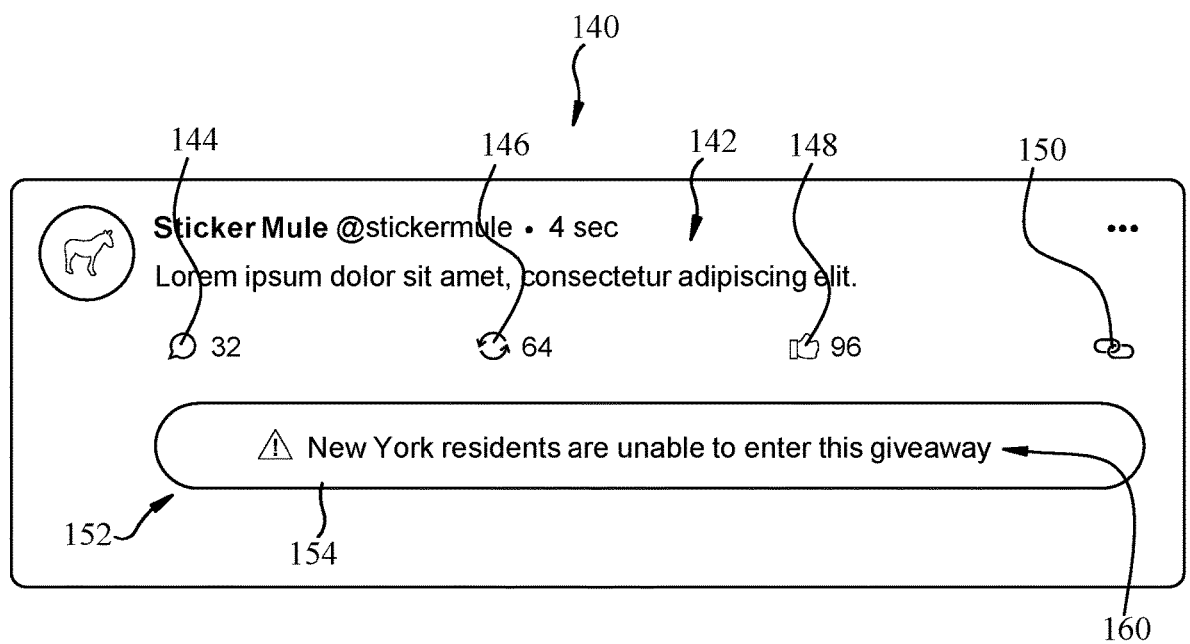
FIG. 15 shows an illustrative view of the virtual button of FIG. 6 including a second set of information of dynamic information after the user interacts with the virtual button, according to further embodiments of the disclosure.

FIG. 15 shows another non-limiting example of Stim 140 after the user interacts with virtual button 152. Distinct from the non-limiting example discussed herein with respect to FIG. 7, the user who clicked on virtual button 152 included in Stim 140 as shown in FIG. 15 may not be successfully entered into the giveaway, but rather may be restricted or prevented from entering. In this example, second set of information 160 displayed on interactive body 154 of virtual button 152 may include giveaway restrictions (e.g., "New York residents are unable to enter this giveaway"). The visual restrictions included in second set of information 160 may indicate the user is excluded from entering the giveaway based on the obtained giveaway data, age of the user, personal data relating to the sponsor of the giveaway, limitations, or restrictions for the number of users who may enter the giveaway, a geolocation of the user and/or the like. That is, when creating a giveaway associated with Stim 140, the entity creating the giveaway and/or the administrator of the giveaway may restrict the giveaway and/or establish rules relating to the giveaway. For example, the entity creating the giveaway and/or the administrator of the giveaway may geographically restrict where winners may reside (e.g., for legal purposes). Geolocation restrictions, as shown in the non-limiting example of FIG. 15, may be determined, established, and/or based upon, for example, predetermined personal information provided by the user interacting with Stim 140. In one example, a user may verify their identity by providing a driver's license confirming their identity, as well as place of residence. This information may be stored, and associated with the specific user. To remind the user that they are unable to enter the giveaway, virtual button 152 may continue to display second set of information 160 including the visual restrictions until the giveaway associated with Stim 140 has ended.

Although discussed herein as being displayed after the user clicks on virtual button 152, in another example, second set of information 160 including giveaway restrictions may be automatically displayed on interactive body 154 of virtual button 152. That is, where a user is restricted from entering into a giveaway associated with Stim 140 based on predetermined geolocation, virtual button 152 may automatically display second set of information 160 including giveaway restriction information (e.g., "New York residents are unable to enter this giveaway"). In either example, once virtual button 152 displays second set of information 160 including giveaway restriction, virtual button 152 included in Stim 140 may remain "inactive" or non-interactive to the user of platform 100 until a third set of information 166 is displayed thereon, as discussed herein.

Figure 16:
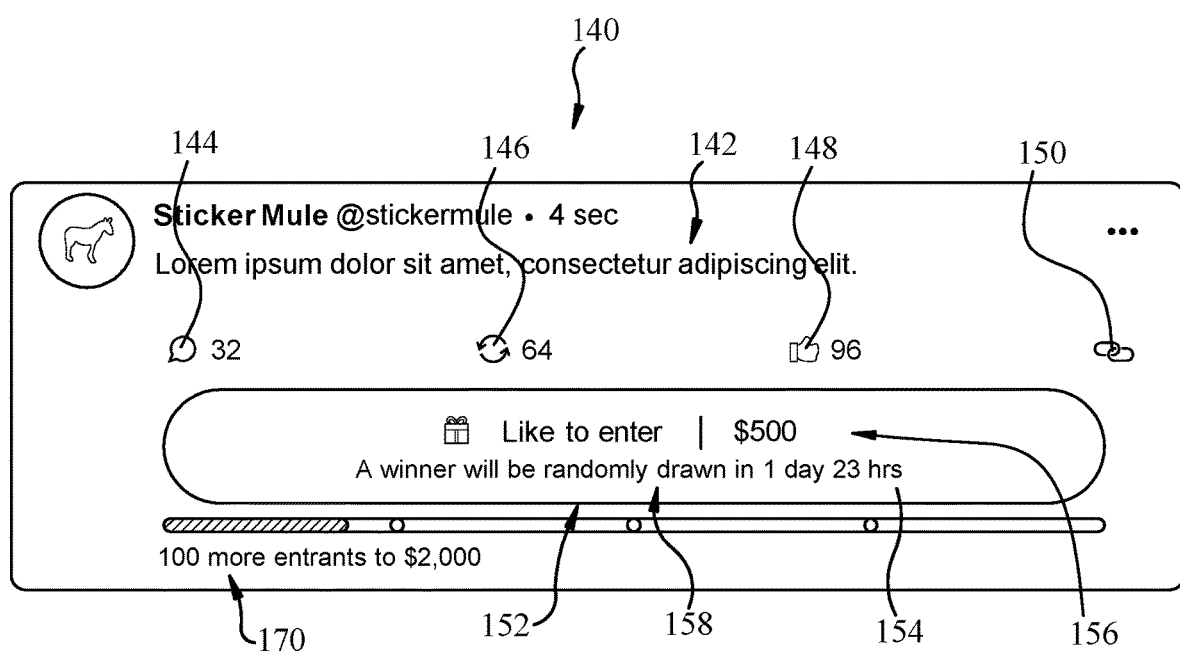
FIG. 16 shows an illustrative view of a virtual button generated for a Stim including the giveaway where the virtual button displays a first set of information of dynamic information prior to a user interacting with the virtual button, according to another embodiment of the disclosure.

FIG. 16 shows a further non-limiting example of Stim 140 including virtual button 152 generated for the giveaway. In this example, first set of information 156 (or second set of information 160, not shown) may also include displaying a number of users participating in the giveaway and/or a milestone number of users required to enter the giveaway to increase the prize value (collectively "170"). In this non-limiting example, the number of users participating in the giveaway may dynamically change over the course of the giveaway and the milestone number of users may be predefined or predetermined by the giveaway data provided by the user posting Stim 140 and sponsoring the giveaway associated therewith (see, FIG. 3).

Figure 17:
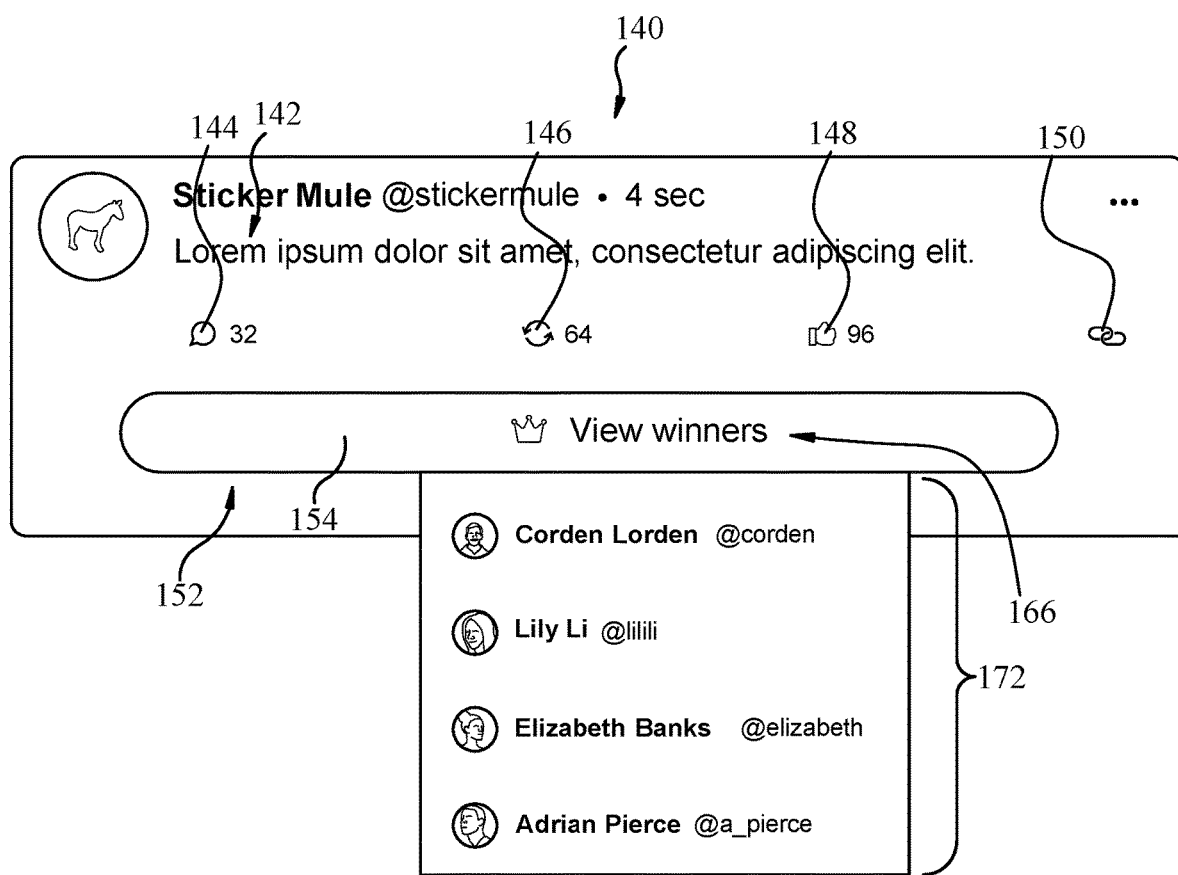
FIG. 17 shows an illustrative view of the virtual button of FIG. 6 including a third set of information of dynamic information after the giveaway has ended and the user performs a rollover action on the virtual button, according to additional embodiments of the disclosure.
Figure 18:
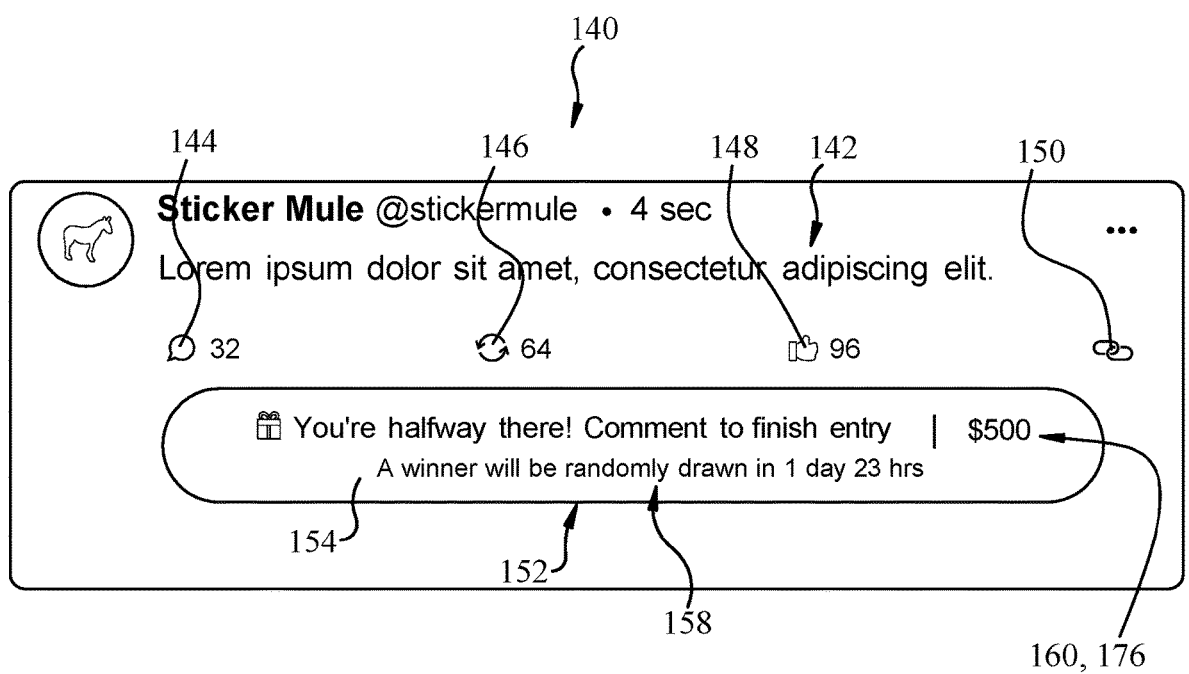
FIG. 18 shows an illustrative view of a virtual button generated for a Stim including the giveaway where the virtual button displays a second set of information of dynamic information after the user interacts with the virtual button, according to additional embodiments of the disclosure.

FIG. 17 shows an additional non-limiting example of Stim 140 after the giveaway has ended. In the example, virtual button 152 may display third set of information 166, as similar discussed herein. Additionally, upon an interaction (e.g., click, rollover action) with virtual button 152, the winners and/or user-data associated with the winners 172 of the giveaway may be displayed adjacent to virtual button 152. In still another non-limiting example (not shown), upon an interaction (e.g., click, rollover action) with virtual button 152, the winners and/or user-data associated with the winners may dynamically/continuously scroll within interactive body 154 of virtual button 152.

Although discussed herein that user-based action is a single action (e.g., like, comment, Restim), it is understood that a user may be required to perform multiple user-based actions in order to enter or participate in a giveaway included within a Stim. For example, a user may be required to both like and follow the user/sponsor who published the Stim including the giveaway. Continuing the examples discussed herein, a user may simply interact, engage, and/or "click" virtual button 152 and platform 100 may automatically "like" the Stim including the giveaway, as similarly discussed herein with respect to FIG. 7. Simultaneously and instantaneously engaging with virtual button 152 may also connect the participating user with the Stim-creating user/sponsor such that the participating user may now be following the Stim-creating user/sponsor of the giveaway. In this non-limiting example, virtual button 152 may automatically perform multiple user-based actions to enter the user in the giveaway, and once complete/confirmed, may dynamically adjust the information displayed thereon from the first set of information 156 to the second set of information 160, as similarly discussed herein with respect to FIGS. 6 and 7.

In non-limiting examples where the user is required to perform multiple user-based actions in order to enter or participate in a giveaway included within a Stim, second set of information of the dynamic information displayed on virtual button 152 may include additional visual outputs. For example, and with reference to FIG. 18, the giveaway included in Stim 140 may require a user to both "like" Stim 140 as well as comment on Stim 140 in order to participate or enter the giveaway. Upon engaging, interacting, and/or "clicking" on virtual button 152 displaying first set of information 156 (not shown), Stim 140 may be automatically and/or instantaneously liked—as confirmed in FIG. 18 by the highlighting, lighting-up, and/or alteration to like toggle 148 of Stim 140. Additionally, upon interacting, engaging, and/or "clicking" on virtual button 152 in the non-limiting example of FIG. 18, comment or reply pop-up window 162, similar to the one shown and discussed herein with respect to FIG. 9, may be automatically and instantaneously provided to the user of platform 100. In an example where the user adds text to text field 164 and clicks on Stim button 122 in pop-up window 162, the user may be entered into the giveaway included in Stim 140 and virtual button 152 may adjust the dynamic information displayed thereon from first set of information 156 to second set of information 160, as similarly discussed herein.

In another example where the user does not complete the comment or reply (e.g., does not add text to text field 164 of pop-up window 162 and click on Stim button 122), the user may not be entered or participate in the giveaway for failing to complete all user-based actions. That is, if the user, for example, prematurely closes pop-up window 162 or quits platform 100 before hitting Stim button 122, the user may not have completed all user-based actions to enter or participate in the giveaway. As such, second set of information 160 displayed on virtual button may include and/or display an incomplete entry notification 176. More specifically, and in the non-limiting example shown in FIG. 18, second set of information 160 displayed on interactive body 154 of virtual button 152 may include incomplete entry notification 176 ("You're halfway there! Comment to finish entry") indicating to the user that additional user-based action(s) need to be performed in order to enter or participate in the giveaway. The user may then interact with virtual button 152, which may again instantaneously provide pop-up window 162 to the user. Alternatively, and as similarly discussed herein, the user may also opt to interact or click reply toggle 144 in Stim 140 to perform the required user-based action. Once the user replies or comments on Stim 140, second set of information 160 displayed on virtual button 152 of Stim 140 may be dynamically altered to display the entrance verification indicating that the user has successfully been entered into the giveaway ("Entered"), as similarly shown and discussed herein with respect to FIG. 7.

Although discussed herein that multiple user-based actions include a like+follow or a like+comment/reply, it is understood that any number of user-based actions may be required to enter the giveaway included with published Stims. Additionally, any combination of the user-based actions discussed herein may be required for the user to enter the giveaway. In any example, virtual button 152 may provide automatic and instantaneous actions to aid the user to more easily, securely, and quickly enter the giveaway included with the Stim displaying virtual button 152.

Figure 19:
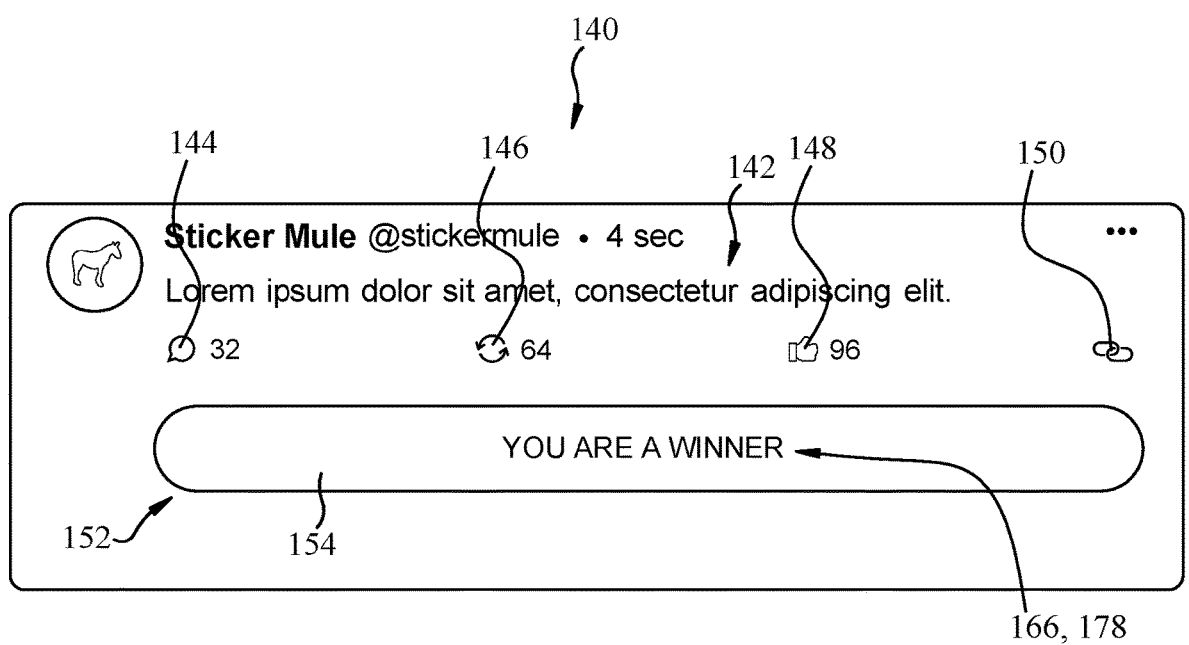
FIG. 19 shows an illustrative view of a generated for a Stim including a giveaway where the virtual button displays a third set of information of dynamic information after the giveaway has ended, according to additional embodiments of the disclosure.

FIG. 19 shows another non-limiting example of Stim 140 after the giveaway has ended. In the example, virtual button 152 may display third set of information 166, as similar discussed herein. Additionally, upon interacting (e.g., click, rollover action) with virtual button 152, a personal, winning notification may be displayed to a winning user. That is, in a non-limiting example where a user interacting with Stim 140 is a winner of the giveaway, third set of information 166 displayed on virtual button 152 may include a personal winning notification 178 (e.g., "YOU ARE A WINNER"), notifying the user that they have in fact won the giveaway. In this example, non-winning users may be provided the third set of information 166 as similarly discussed herein with respect to FIGS. 10, 11, and/or 17.

Although discussed herein as virtual button 152 performing various user-based actions automatically upon interaction, it is understood that the user may perform the user-based actions independent of virtual button 152. For example, where a user is required to like a Stim, a user may interact, engage, and/or click the like toggle 148 instead of interacting with virtual button 152 included in Stim 140. Performing this user-based action may be substantially similar to interacting with virtual button 152 in that the user may be successfully entered into the giveaway subsequent to completing the required user-based action. In the non-limiting example where the user performs the user-based action without interacting with virtual button 152, virtual button 152 included in Stim 140 may continue to follow the process discussed herein with respect to FIGS. 7-12, for example. That is, even if the user does not utilize virtual button 152 to automatically perform the user-based actions to enter the giveaway, if the user performs the required actions, virtual button 152 may follow the processes discussed herein for dynamically displaying the second set of information 160 and subsequently the third set of information 166 as if the user did utilize virtual button 152. In the example, when the user completes all required user-based actions, virtual button 152 may be adjusted to no longer display the first set of information 156, and may subsequently display the second set of information 160 and third set of information 166, respectively.

Figure 20:
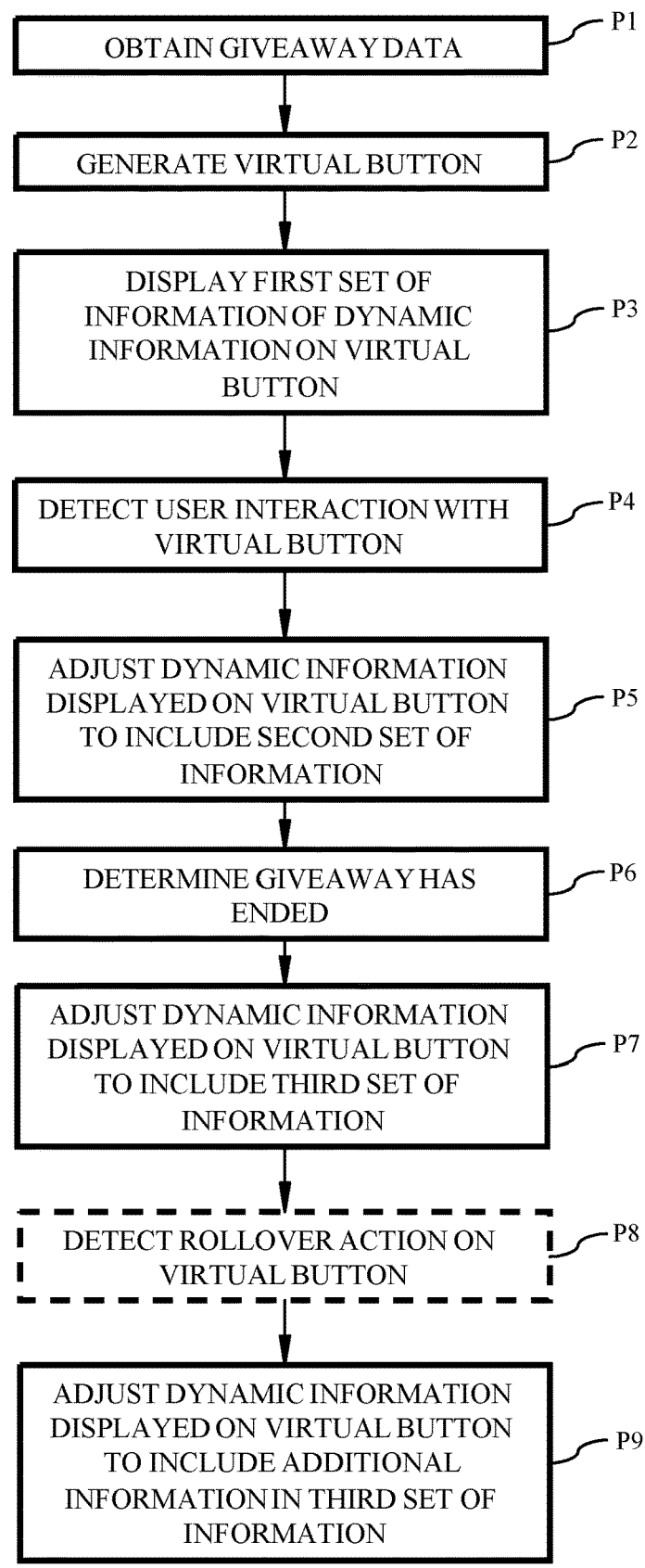
FIG. 20 shows a flowchart illustrating a process for dynamically displaying giveaway information relating to a giveaway on a virtual button, according to embodiments of the disclosure.

FIG. 20 depicts example processes for dynamically displaying giveaway information. More specifically, FIG. 20 depicts a non-limiting example of processes for displaying dynamic information relating to a giveaway on a generated, virtual button. The virtual button and dynamic information in these processes may be substantially similar to those shown and discussed herein with respect to FIGS. 1-19, and may be generated and displayed using the computing system of FIG. 21.

In process P1 giveaway data may be obtained. That is, predetermined data relating to the giveaway included in the user-generated Stim may be obtained, determined, detected, and/or received. The predetermined giveaway data provided by the user may include, but is not limited to, a predetermined prize amount or value for the giveaway, a predetermined number of winners for the giveaway, predetermined user-based actions in order for the user to enter the giveaway, and/or a predetermined end date/time for the giveaway. In non-limiting examples, the predetermined user-based actions may include the user reply to the Stim including the giveaway, Restim (e.g., repost) the Stim including the giveaway, or like the Stim including the giveaway.

In process P2 a virtual button may be generated. More specifically, a virtual button pertaining to the giveaway associated with and/or included in the Stim may be created, built, generated, and/or established within the social media platform. As discussed herein, the single, virtual button generated in process P2 may be the single button used in various stages of the giveaway and/or may provide various interactive options and information relating to the giveaway for the user.

In process P3 dynamic information may be displayed on the generated, virtual button. That is, virtual button may display a first set of information of dynamic information relating to the giveaway. The first set of information may be displayed on the generated, virtual button prior to a user interacting with the virtual button. At least a portion of the displayed first set of information may be dependent or based on the predetermined giveaway data obtained in process P1. For example, displaying the first set of information may include displaying a prize value (e.g., monetary prize or physical prize) for the giveaway and/or displaying a number of winners for the giveaway, where the prize value and the number of winners may be defined by the giveaway data. Additionally, or alternatively, displaying the first set of information may include displaying user-action instructions (e.g., like, reply, Restim) to enter the giveaway, and/or displaying a time counter identifying an end of the giveaway. Similar to the prize value and number of winners, the user-instructions and the end of the giveaway may be defined by the giveaway data. In additional non-limiting examples, displaying the first set of information may include displaying a number of users participating in the giveaway, and/or displaying a milestone number of users required to enter the giveaway to increase the prize value of the giveaway. In this non-limiting example, the milestone number of users may also be defined by the giveaway data.

In process P4 a user's interaction with the virtual button may be detected. More specifically, a user may interact, engage, and/or "click" on the generated, virtual button in order to automatically perform the user-based action, as defined by the predetermined giveaway data, in order to enter or participate in the giveaway. In the non-limiting example where the user is required to "like" the Stim including the giveaway, interacting or "clicking" the virtual button may automatically "like" the Stim and enter the user into the giveaway, if restrictions do not apply (see, process P5). In another example where the user is required to Restim the Stim including the giveaway, interacting or "clicking" the virtual button may automatically Restim the original Stim and enter the user into the giveaway, if restrictions do not apply (see, process P5). In a further non-limiting example where the user is required to reply to the Stim including the giveaway, interacting or "clicking" the virtual button may automatically generate a pop-up window to allow a user to reply or input text in response to the original Stim. Once the user enters the text and replies, the user may then be entered into the giveaway, if restrictions do not apply (see, process P5).

In process P5 the dynamic information may be adjusted. More specifically, and in response to detecting the user's interaction with the virtual button in process P4, the dynamic information displayed on the virtual button may be adjusted, altered, and/or changed from the first set of information to a second set of information. As discussed herein, the second set of information may be displayed on the generated, virtual button in response to or subsequent to the user interacting with the virtual button to enter or be disqualified from the giveaway. Similar to the first set of information, at least a portion of the displayed second set of information may be dependent or based on the predetermined giveaway data obtained in process P1. For example, adjusting the virtual button to display the second set of information may include continuing to display the prize value for the giveaway, the number of winners for the giveaway, and/or the time counter identifying an end of the giveaway. As similarly discussed herein with respect to process P3, the prize value, the number of winners, and the time counter may be defined by the giveaway data. In additional non-limiting examples, adjusting the virtual button to display the second set of information may include displaying a number of users participating in the giveaway, and/or displaying a milestone number of users required to enter the giveaway to increase the prize value of the giveaway. In this non-limiting example, the milestone number of users may also be defined by the giveaway data. In this example, process P5 may continue to display the number of user participants/milestone number of users previously displayed in process P3. Alternatively, where no number of user participants/milestone number of users are displayed in process P3, the number of user participants/milestone number of users may be displayed on the virtual button in process P5.

Additionally, adjusting the dynamic information displayed on the virtual button in process P5 may include discontinuing to display the user-action instructions to enter the giveaway as a result of the user performing or attempting to perform the user-based actions. In an example where the user successfully enters the giveaway by performing the user-based actions, and no restrictions (e.g., geolocation) prevent the user from participating in the giveaway, adjusting the virtual button to display the second set of information in process P5 may also include displaying entrance verification on the virtual button. That is, after successfully entering the giveaway, an entrance verification or confirmation may be displayed on the virtual button indicating that the user has successfully been entered into the giveaway. Conversely, where the user is excluded or restricted from entering the giveaway, for example due to geolocation, adjusting the virtual button to display the second set of information in process P5 may include displaying a visual restriction on the virtual button. The visual restriction displayed on the virtual button may indicate that the user is excluded from entering or participating in the giveaway. As discussed herein, users may be restricted or excluded from participating in giveaways base on the obtained giveaway data, age of the user, personal data relating to the sponsor of the giveaway, limitations or restrictions for the number of users who may enter the giveaway, a geolocation of the user and/or the like. In still another example where the user has not completed all user-based actions in order to enter or participate in the giveaway associated with the Stim, an incomplete entry notification may be displayed on the virtual button. The incomplete entry notification displayed on the virtual button may be included in the second set of information and may indicate that the user has not been entered into the giveaway and/or indicating to the user that additional user-based action(s) need to be performed in order to enter or participate in the giveaway.

In process P6 it may be determined that the giveaway has ended. For example, after a predetermined duration of time, it may be determined, verified, and/or confirmed that the giveaway included in the Stim has ended. As discussed herein, the end date and/or time for a giveaway may be predetermined based on the giveaway data obtained in process P1 and/or set by the sponsor of the giveaway.

In process P7 the dynamic information may be adjusted again. More specifically, and in response to determining the giveaway has ended in process P6, the dynamic information displayed on the virtual button may be adjusted, altered, and/or changed from the second set of information to a third set of information. As discussed herein, the third set of information may be displayed on the generated, virtual button in response to or subsequent to the giveaway ending. Similar to the first and second sets of information, at least a portion of the displayed third set of information may be dependent or based on the predetermined giveaway data obtained in process P1. For example, adjusting the virtual button to display the third set of information may include continuing to display the prize value for the giveaway, and/or the number of winners for the giveaway. As similarly discussed herein with respect to processes P3 and P5, the prize value, and/or the number of winners may be defined by the giveaway data.

Adjusting the dynamic information displayed on the virtual button in process P7 may further include discontinuing to display the entrance verification or the visual restrictions previously displayed on the virtual button in process P5. In place of the discontinued information of the second set of information, adjusting the dynamic information may also include displaying an expiration confirmation on the virtual button. More specifically, in place of the entrance verification or the visual restrictions, the virtual button may be adjusted to display an expiration confirmation indicating that the giveaway has ended and users are no longer able to perform the user-based actions to enter or participate in the giveaway.

In process P8 (shown in phantom as optional) a rollover action may be detected. More specifically, and subsequent to the ending of the giveaway (process P6) and the adjustment of the virtual button to display the third set of information (process P7), rollover actions may be detected on the virtual button. Rollover actions may be detected, occur, and/or triggered when a user moves the indicator component (e.g., mouse, cursor, stylus, finger, etc.) over the virtual button. In non-limiting examples, the rollover event may be detected and subsequent processes may be triggered (e.g., process P9) by merely moving the indicator component over the virtual button, or alternatively when the indicator component is moved over the virtually button and the button is subsequently interacted with, engaged, and/or "clicked."

In process P9 the dynamic information may be once again adjusted. More specifically, and in response to detecting a rollover event on the virtual button in process P8, the dynamic information displayed on the virtual button may be adjusted, altered, and/or changed to include additional information in the third set of information. For example, and subsequent to detecting a rollover event, adjusting the dynamic information on the virtual button in process P9 may include discontinuing to display the expiration confirmation indicating the giveaway has ended. In place of the expiration confirmation, additional information may be displayed on the virtual button. In one non-limiting example, a winner notification may be displayed on the virtual button. The winner notification may prompt the user to interact, engage, and/or "click" the virtual button to view user-data for the winning users of the giveaway. In this example, and upon interacting with the virtual button in process P9, a separate pop-up window may be visually provided and/or appear including user-data for the winning user(s) of the giveaway. In another non-limiting example, and in response to detecting the rollover action in process P8, user-data for the winning user of the giveaway may appear or be displayed. In one example, the user-data for the winning user(s) may be displayed as a dropdown list originating from the virtual button. In another example, user-data for the winner may be displayed directly on and may scroll through the virtual button during the rollover action. In another non-limiting example, when a user who is deemed a winner of the giveaway interacts (e.g., clicks, performs a rollover) with the virtual button, the winning user may receive a personal winning notification. That is, adjusting the virtual button to display the third set of information may include displaying the personal winning notification to notify the winning user that they have in fact won the giveaway.

Figure 21:
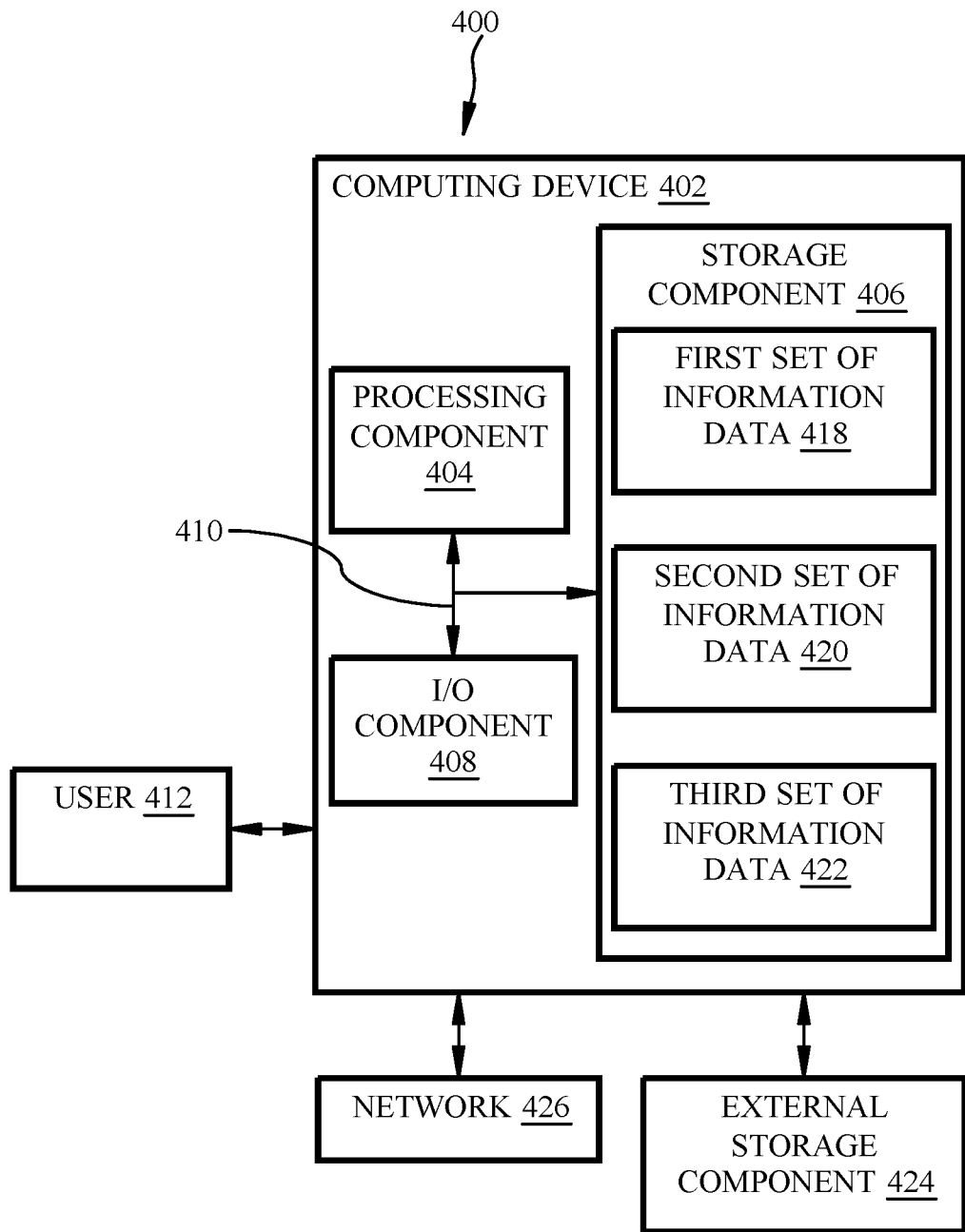
FIG. 21 shows a schematic view of a computing system configured to display dynamic information relating to a giveaway on a virtual button, according to embodiments of the disclosure.

FIG. 21 depicts a schematic view of a computing environment or system 400 (hereafter, "computing system 400"), and the various components included within computing system 400. In the non-limiting example shown in FIG. 21, computing system 400 may include at least one computing device 402 that may be configured to generate a virtual button (see e.g., FIGS. 6-11) for dynamically displaying giveaway information by performing the processes P1-P9 discussed herein with respect to FIG. 20. It is understood that similarly numbered and/or named components may function in a substantially similar fashion. Redundant explanation of these components has been omitted for clarity.

It is understood that computing device(s) 402 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 400 may include any type of computing device(s) 402 and for example includes at least one processor or processing component(s) 404, storage component 406, input/output (I/O) component(s) 408 (including a keyboard, touchscreen, or monitor display), and a communications pathway 410. In general, processing component(s) 404 execute program code which is at least partially fixed or stored in storage component 406. While executing program code, processing component(s) 404 can process data, which can result in reading and/or writing transformed data from/to storage component 406 and/or I/O component(s) 408 for further processing. The pathway 410 provides a communications link between each of the components in computing device(s) 402. I/O component 408 can comprise one or more human I/O devices, which enables user 412 to interact with computing device(s) 402 to create stims with giveaways and generated virtual buttons that dynamically display information relating to the giveaway, as discussed herein. Computing device(s) 402 may also be implemented in a distributed manner such that different components reside in different physical locations.

Storage component 406 may also include modules, data and/or electronic information relating to various other aspects of computing system 400. Specifically, operational modules, electronic information, and/or data relating to first set of information data 418, second set of information data 418, and third set of information data 420. The operational modules, information, and/or data may include the required information and/or may allow computing system 400, and specifically computing device 402, to perform the processes discussed herein for creating stims with giveaways and generated virtual buttons that dynamically display information relating to the giveaway.

Computing system 400, and specifically computing device 402 of computing system 400, may also be in communication with external storage component 424. External storage component 424 may be configured to store various modules, data and/or electronic information relating to various other aspects of computing system 400, similar to storage component 406 of computing device(s) 402. Additionally, external storage component 424 may be configured to share (e.g., send and receive) data and/or electronic information with computing device(s) 402 of computing system 400. In the non-limiting example shown in FIG. 21, external storage component 424 may include any or all of the operational modules and/or data shown to be stored on storage component 406 (e.g., data 418-422). In a non-limiting example, external storage component 424 may be a cloud-based storage component or system.

In a non-limiting example shown in FIG. 21, computing device(s) 402 may be in communication with and/or may be configured to share (e.g., send and receive) data and/or electronic information over a network 426. Network 426 may represent a closed network, such as a local area network (LAN) or may include the internet. During operation of computing device 402, the Stim including the giveaway created by user 412 may be disseminated over network 426.

Furthermore, it is understood that computing device(s) 402 of computing system 400 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components will be transmitted to the proxy server and then it will be stored on the proxy server.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data (e.g., obtain giveaway data, etc.). It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

We claim:

1. A computing device comprising:
a processor; and
memory coupled with the processor, the memory storing a computer program product including program code, which when executed by the processor causes the processor to:
display a dynamic virtual button as in interactive body with a visible border, the dynamic virtual button is displayed in a social media feed in a graphical user interface (GUI), comprising:
dynamic information displayed within the visible border of the interactive body, the dynamic information associated with a giveaway, wherein the dynamic information includes:
a first set of information relating to the giveaway and displayed prior to a user's interaction with the interactive body;
a second set of information relating to the giveaway and displayed after the user's interaction with the interactive body; and
a third set of information relating to the giveaway and displayed after the giveaway has ended,
wherein the dynamic virtual button is displayed as a portion of the social media feed in the GUI, the social media feed including a plurality of posts, wherein the social media feed is provided by a social media platform and wherein at least one of the plurality of posts is included in distinct social media feed of multiple distinct users, wherein the dynamic virtual button is presented in the distinct social media feed of each of the multiple distinct users;
updating the dynamic virtual button in the distinct social media feed for each of the multiple distinct users in response to user interaction with the dynamic virtual button by each of the multiple distinct users; and
for a winning user of the multiple distinct users: the third set of information relating to the giveaway further includes: a personal winning notification notifying the winning user they have won the giveaway, wherein the personal winning notification is contained within the visible border of the interactive body in the distinct social media feed of the winning user.

2. The computing device of claim 1, wherein at least a portion of the dynamic information associated with the giveaway is based on giveaway data predetermined prior to displaying the first set of information within the interactive body, wherein the first set of information relating to the giveaway includes at least one of:
a prize value for the giveaway, the prize value defined by the giveaway data,
a number of winners for the giveaway, the number of winners defined by the giveaway data,
user-action instructions to enter the giveaway, the user-action instructions defined by the giveaway data, or
a time counter identifying an end of the giveaway, the end of the giveaway defined by the giveaway data.

3. The computing device of claim 2, wherein the first set of information relating to the giveaway further includes:
a milestone number of users of the social media feed required to enter the giveaway to increase the prize value of the giveaway, wherein the milestone number of users of the social media feed is defined by the giveaway data.

4. The computing device of claim 2, wherein the second set of information relating to the giveaway includes:
the number of winners for the giveaway, the number of winners defined by the giveaway data.

5. The computing device of claim 2, wherein the second set of information relating to the giveaway includes visual restrictions indicating the user is excluded from entering the giveaway based on a geolocation of a user of the multiple distinct users indicating a state of residence of the user, wherein the state of residence of the user restricts access to the giveaway, wherein the second set of information relating to the giveaway further includes:
a milestone number of users required to enter the giveaway to increase the prize value of the giveaway, the milestone number of users is defined by the giveaway data.

6. The computing device of claim 2, wherein the third set of information relating to the giveaway includes:
the prize value for the giveaway, the prize value defined by the giveaway data, and
the number of winners for the giveaway, the number of winners defined by the giveaway data,
wherein the third set of information relating to the giveaway further includes:
a winner notification prompting the user to interact with the interactive body to view user-data for the winning user of the giveaway, wherein the winner notification of the third set of information is displayed on the body in response to the user performing a rollover action on the interactive body; and
user-data for the winning user of the giveaway, the user-data displayed on the interactive body in response to the user performing a rollover action on the interactive body.

7. The computing device of claim 1, wherein the program code further causes the processor to display winning user data associated with one or more winners of the giveaway in the distinct social media feed that is accessible to all participating users in the giveaway.

8. A method for displaying dynamic information relating to a giveaway on a dynamic virtual button in a social media feed including a plurality of posts, the method comprising:
   generating the dynamic virtual button as an interactive body with a visible border, the dynamic virtual button is displayed in the social media feed in response to obtaining giveaway data;
   displaying a first set of information of the dynamic information on the generated dynamic virtual button, the first set of information relating to the giveaway and displayed prior to a user's interaction with the generated dynamic virtual button;
   detecting the user's interaction with the generated dynamic virtual button;
   in response to detecting the user's interaction with the generated dynamic virtual button, adjusting the dynamic information displayed on the generated dynamic virtual button from the first set of information to a second set of information of the dynamic information;
   determining that the giveaway has ended based on the obtained giveaway data;
   in response to determining that the giveaway has ended, adjusting the dynamic information displayed on the generated dynamic virtual button from the second set of information to a third set of information of the dynamic information,
   wherein the social media feed is provided by a social media platform and wherein at least one of the plurality of posts is included in distinct social media feed of multiple distinct users, wherein the generated dynamic virtual button is presented in the distinct social media feed of each of the multiple distinct users and the generated dynamic virtual button is updated for each of the multiple distinct users in response to user interaction with the generated dynamic virtual button by each of the multiple distinct users; and
   for a winning user of the multiple distinct users: displaying a personal winning notification notifying the winning user they have won the giveaway, wherein the personal winning notification is contained within the visible border of the interactive body in the distinct social media feed of the winning user.

9. The method of claim 8, wherein the social media feed includes a plurality of posts, wherein displaying the first set of information on the generated dynamic virtual button further includes at least one:
   displaying a prize value for the giveaway, the prize value defined by the giveaway data,
   displaying a number of winners for the giveaway, the number of winners defined by the giveaway data,
   displaying user-action instructions to enter the giveaway, the user-action instructions defined by the giveaway data, or
   displaying a time counter identifying an end of the giveaway, the end of the giveaway defined by the giveaway data.

10. The method of claim 9, wherein displaying the first set of information on the generated dynamic virtual button further includes displaying a milestone number of users required to enter the giveaway to increase the prize value of the giveaway, the milestone number of users is defined by the giveaway data.

11. The method of claim 9, wherein adjusting the dynamic information displayed on the generated dynamic virtual button from the first set of information to the second set of information of the dynamic information further includes:
   discontinuing to display the user-action instructions to enter the giveaway;
   one of: displaying an incomplete entry notification indicating a user of the multiple distinct users has not been entered into the giveaway, displaying entrance verification indicating the user has successfully been entered into the giveaway, or displaying visual restrictions indicating the user is excluded from entering the giveaway based on at least one of the obtained giveaway data or a geolocation of the user; and
   continuing to display at least one of: the prize value for the giveaway, the prize value defined by the giveaway data, the number of winners for the giveaway, the number of winners defined by the giveaway data, or the time counter identifying the end of the giveaway, the end of the giveaway defined by the giveaway data,
   wherein adjusting the dynamic information displayed on the generated dynamic virtual button from the first set of information to the second set of information of the dynamic information further includes at least one of: displaying a number of users participating in the giveaway, or displaying a milestone number of users required to enter the giveaway to increase the prize value of the giveaway, the milestone number of users is defined by the giveaway data,
   wherein adjusting the dynamic information displayed on the generated [,] dynamic virtual button from the second set of information to the third set of information of the dynamic information further includes:
      discontinuing to display one of: the incomplete entry notification indicating the user has not been entered into the giveaway, the entrance verification indicating the user has successfully been entered into the giveaway, or the visual restrictions indicating the user is excluded from entering the giveaway;
      displaying an expiration confirmation indicating the giveaway has ended;
      continuing to display at least one of: the prize value for the giveaway, the prize value defined by the giveaway data, or the number of winners for the giveaway, the number of winners defined by the giveaway data; and
      displaying a personal winning notification notifying the user they have won the giveaway; and
   detecting a rollover action on the generated dynamic virtual button;
   in response to detecting the rollover action:
      discontinuing to display the expiration confirmation indicating the giveaway has ended; and
      either: displaying a winner notification prompting the user to interact with the generated dynamic virtual button to view user-data for the winning user of the giveaway, or displaying user-data for the winning user of the giveaway.

12. A computer program product stored on a non-transitory computer-readable storage medium, which when executed by a computing system, displays dynamic information relating to a giveaway on a dynamic virtual button displayed as an interactive body within a visible border, the dynamic virtual button is displayed in a social media feed including a plurality of posts, the computer program product comprising:
- program code that generates the dynamic virtual button in response to obtaining giveaway data;
- program code that displays a first set of information of the dynamic information on the generated dynamic virtual button, the first set of information relating to the giveaway prior to a user's interaction with the virtual button;
- program code that detects the user's interaction with the generated dynamic virtual button;
- program code that adjusts the dynamic information displayed on the generated dynamic virtual button from the first set of information to a second set of information of the dynamic information in response to the program code detecting the user's interaction with the generated dynamic virtual button;
- program code that determines that the giveaway has ended based on the obtained giveaway data;
- program code that adjusts the dynamic information displayed on the generated dynamic virtual button from the second set of information to a third set of information of the dynamic information in response to the program code determining that the giveaway has ended,
- wherein the social media feed is provided by a social media platform and wherein at least one of the plurality of posts is included in distinct social media feed of multiple distinct users, wherein the generated dynamic virtual button is presented in the distinct social media feed of each of the multiple distinct users and the generated dynamic virtual button is updated for each of the multiple distinct users in response to user interaction with the generated dynamic virtual button by each of the multiple distinct users; and
- program code that, for a winning user of the multiple distinct users, displays a personal winning notification notifying the winning user they have won the giveaway, wherein the personal winning notification is contained within the visible border of the interactive body in the distinct social media feed of the winning user.

13. The computer program product of claim 12, wherein the program code that displays the first set of information on the generated, virtual button further includes at least one:
- program code that displays a prize value for the giveaway, the prize value defined by the giveaway data,
- program code that displays a number of winners for the giveaway, the number of winners defined by the giveaway data,
- program code that displays user-action instructions to enter the giveaway, the user-action instructions defined by the giveaway data,
- program code that displays a time counter identifying an end of the giveaway, the end of the giveaway defined by the giveaway data,
- program code that displays a number of users participating in the giveaway, or
- program code that displays a milestone number of users required to enter the giveaway to increase the prize value of the giveaway, the milestone number of users is defined by the giveaway data.

14. The computer program product of claim 13, wherein the program code that adjusts the dynamic information displayed on the generated [,] dynamic virtual button from the first set of information to the second set of information of the dynamic information further includes:
- program code that discontinues to display the user-action instructions to enter the giveaway;
- at least one of: program code that displays an incomplete entry notification indicating a user of the multiple distinct users has not been entered into the giveaway, program code that displays entrance verification indicating the user has successfully been entered into the giveaway, or program code that displays visual restrictions indicating the user is excluded from entering the giveaway based on at least one of the obtained giveaway data or a geolocation of the user;
- program code that continues to display at least one of: the prize value for the giveaway, the prize value defined by the giveaway data, the number of winners for the giveaway, the number of winners defined by the giveaway data, or the time counter identifying the end of the giveaway, the end of the giveaway defined by the giveaway data; and
- at least one of: program code that displays a number of users participating in the giveaway, or program code that displays a milestone number of users required to enter the giveaway to increase the prize value of the giveaway, the milestone number of users is defined by the giveaway data.

15. The computer program product of claim 13, wherein the program code that adjusts the dynamic information displayed on the generated dynamic virtual button from the second set of information to the third set of information of the dynamic information further includes:
- program code that discontinues to display one of: the entrance verification indicating the user has successfully been entered into the giveaway, or the visual restrictions indicating the user is excluded from entering the giveaway;
- program code that displays an expiration confirmation indicating the giveaway has ended; and
- program code that continues to display at least one of: the prize value for the giveaway, the prize value defined by the giveaway data, or the number of winners for the giveaway, the number of winners defined by the giveaway data, further comprising:
- program code that detects a rollover action on the generated dynamic virtual button;
- program code that discontinues to display the expiration confirmation indicating the giveaway has ended in response to the program code detecting the rollover action; and
- program code that displays, in response to the program code detecting the rollover action, at least one of: a winner notification prompting the user to interact with the generated dynamic virtual button to view user-data for the winning user of the giveaway, or user-data for the winning user of the giveaway.

16. The computer program product of claim 12, further comprising program code that displays winning user data associated with one or more winners of the giveaway in the distinct social media feed that is accessible to all participating users in the giveaway.

* * * * *